United States Patent
Chitrakar et al.

(10) Patent No.: US 12,095,527 B2
(45) Date of Patent: Sep. 17, 2024

(54) COMMUNICATION APPARATUS AND COMMUNICATION METHOD FOR MULTI-AP JOINT TRANSMISSION

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 18/470,221

(22) Filed: Sep. 19, 2023

(65) Prior Publication Data

US 2024/0056127 A1 Feb. 15, 2024

Related U.S. Application Data

(63) Continuation of application No. 17/602,620, filed as application No. PCT/SG2020/050128 on Mar. 11, 2020, now Pat. No. 11,804,878.

(30) Foreign Application Priority Data

Apr. 26, 2019 (SG) .......................... 10201903821U

(51) Int. Cl.
*H04B 7/024* (2017.01)
*H04B 7/0413* (2017.01)
*H04L 5/00* (2006.01)

(52) U.S. Cl.
CPC .......... *H04B 7/024* (2013.01); *H04B 7/0413* (2013.01); *H04L 5/0035* (2013.01); *H04L 5/0044* (2013.01)

(58) Field of Classification Search
CPC ..... H04B 7/024; H04B 7/0413; H04L 5/0035; H04L 5/0044
See application file for complete search history.

(56) References Cited

U.S. PATENT DOCUMENTS

| | | | |
|---|---|---|---|
| 2013/0223343 | A1 | 8/2013 | Wentink et al. |
| 2015/0288427 | A1 | 10/2015 | Wang et al. |
| 2016/0234802 | A1 | 8/2016 | Yang et al. |
| 2018/0205434 | A1 | 7/2018 | Cherian et al. |

(Continued)

FOREIGN PATENT DOCUMENTS

| | | |
|---|---|---|
| CN | 110691381 A | 1/2020 |
| EP | 3962232 A1 | 3/2022 |

(Continued)

OTHER PUBLICATIONS

Extended European Search Report, dated May 24, 2022, for European Patent Application No. 20795501.4-1215. (10 pages).

(Continued)

*Primary Examiner* — Rahel Guarino
(74) *Attorney, Agent, or Firm* — Seed IP Law Group LLP

(57) ABSTRACT

An access point (AP) includes circuitry, which, in operation, generates a frame that includes joint transmission (JT) data and a JT identity that uniquely identifies the JT data. The access point further includes a transmitter, which, in operation, transmits the frame to one or more APs that jointly transmit the JT data to a communication apparatus.

16 Claims, 20 Drawing Sheets

(56) References Cited

U.S. PATENT DOCUMENTS

2019/0288767 A1* 9/2019 Wang .................... H04W 16/12
2021/0127290 A1 4/2021 Yang et al.
2022/0190880 A1 6/2022 Chitrakar et al.

FOREIGN PATENT DOCUMENTS

SG      10201903821      11/2020
WO      WO 2020231326 A1      11/2020

OTHER PUBLICATIONS

International Search Report, mailed Jun. 12, 2020, for International Application No. PCT/SG2020/050128. (5 pages).
Ryu et al., "Consideration on multi-AP coordination for EHT," IEEE 802.11-18/1982rl, Jan. 9, 2019, Slides 3-5, pp. 7-8.
Schelstraete et al., "Joint Beamforming protocol simulation," IEEE 802.11-19/0092, Jan. 11, 2019, Slides 3-4, pp. 6-7.
Singaporean Office Action, dated Aug. 25, 2022, for Singaporean Patent Application No. 11202111337P. (12 pages).

* cited by examiner

COMMUNICATION APPARATUS AND COMMUNICATION METHOD FOR MULTI-AP JOINT TRANSMISSION

BACKGROUND

1. Technical Field

The present disclosure generally relates to communication apparatus and methods for electronic devices and systems, and more particularly relates to joint transmission in multi-AP networks.

2. Description of Related Art

Wireless networks that communicate via multi-AP joint transmission enable electronic devices to communication in networks with joint transmissions sent to multiple electronic devices. Such networks have advantages over other wireless networks in which wireless communication is limited to a single transmission to one electronic device.

SUMMARY

One non-limiting and exemplary embodiment facilitates providing joint transmission communication in multi-AP networks. By way of example, this communication includes joint transmission from two or more of an access point (AP) to one or more wireless station (STA).

In one general aspect, the techniques disclosed here feature an access point (AP). The access point includes circuitry, which, in operation, generates a frame including joint transmission (JT) data and a JT identity that uniquely identifies the JT data; and a transmitter, which, in operation, transmits the frame to one or more other APs that jointly transmit the JT data to a communication apparatus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

Figure 1:
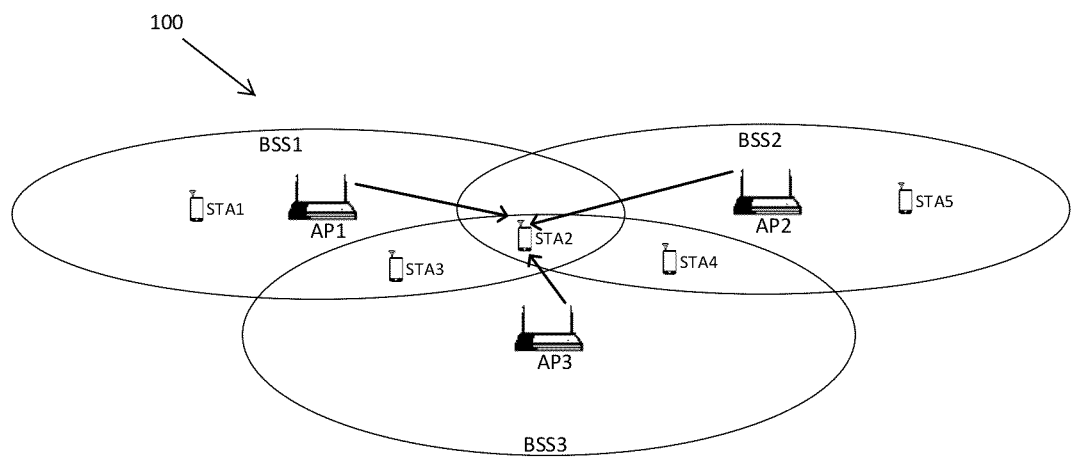
FIG. 1 is a wireless network with a multi-AP system in accordance with an example embodiment.

Skilled artisans will appreciate that elements in the figures are illustrated for simplicity and clarity and have not necessarily been depicted to scale.

DETAILED DESCRIPTION

Electronic devices can be configured to transmit and receive joint transmission (JT) data in multi-AP networks. These electronic devices have many advantages over conventional electronic devices that are limited to single transmissions to a single electronic device. Performing joint transmissions in multi-AP networks, however, has numerous technical problems.

Existing 802.11 BSSs (Basic Service Sets) operate as a standalone unit. The APs of each BSS provide wireless communication service only to the wireless stations (STA) that are associated with the respective APs. The data rate that the AP can provide for the wireless link to an associated STA depends on the MCS (modulation and coding scheme) used for the link, which in turn depends on the SINR (signal-tointerference-plus-noise ratio) of each STA. Typically higher MCS can be achieved at higher SINR, while only a low MCS may be possible at low levels of SINR. In a standalone BSS, while the signal ratio may be controlled by the AP by adjusting the Transmit Power, the interference experience by a STA is much more difficult to control. This problem is especially true for STAs that exist at the edge of a network and that are within the wireless range of multiple BSSs (also known as the OBSS (Overlapping BSS) zone). A useful signal in one BSS is essentially interference for the STAs of another BSS.

Multi-AP coordination (e.g., coordination among the APs of neighboring BSSs) can be used as an effective way for improving the SINR of member STAs. Such schemes are made possible by the proliferation of APs, such as dense AP deployment in a managed network (e.g. enterprise network, stadium settings, etc.) or in-home networks (e.g., with multi-AP home mesh networks).

The various multi-AP coordination schemes can may be divided into two general groups. The first group includes schemes that attempt to reduce the interference to OBSS through Transmit power control, coordinated beamforming, coordinated Null-forming, coordinated scheduling, etc. The second group includes schemes that attempt to increase the signal level at a STA through synchronized transmission by multiple APs to the same STA. Schemes of the second group may be known as Multi-AP Joint Processing or Multi-AP Joint Transmission, or Distributed MU-MIMO.

Joint Transmission not only improves the signal level, but also decreases interference by converting the interfering signal to desired signal. Example embodiments thus solve technical problems associated with STAs in overlapping BSSs or multi-AP systems by reducing interference to the STAs and improving SINR to the STAs. These problems include how to distribute and synchronize Joint Transmission Data (Joint MU-MIMO Data) among Slave APs and other problems discussed herein.

Example embodiments include apparatus and methods that transmit and receive joint transmissions in multi-AP networks. Such apparatus and methods include electronic devices with transmitters and/or receivers, such as APs and STAs. One example embodiment is an AP that includes circuitry, which, in operation, generates a frame, a frame body of the frame includes joint transmission (JT) data and a JT identity that uniquely identifies the JT data; and a transmitter, which, in operation, transmits the frame to one or more APs that jointly transmit the JT data to a communication apparatus.

Another example embodiment is an access point (AP) that includes a receiver, which, in operation, receives from an AP a frame that includes Joint Transmission (JT) data and a JT identity that uniquely identifies the JT data; and local memory that stores the JT data and the JT identity.

Another example embodiment is a communication method in which one or more access points (APs) jointly transmit to a communication apparatus. The method includes, the method comprising transmitting, from a first AP and to one or more second APs, a frame in which a frame body of the frame includes joint transmission (JT) data and a JT identity that uniquely identifies the JT data; and transmitting, from the one or more second APs, the JT data jointly to the communication apparatus.

FIG. 1 is a wireless network with a multi-AP system 100 in accordance with an example embodiment. By way of example, the system 100 includes three BSSs (shown as BSS1, BSS2, and BSS3). Each BSS has at least one AP (shown as AP1, AP2, and AP2). A plurality of STAs (shown as STA1-STA5) are distributed throughout the system. STA1 exists in a single BSS (BSS1); STA2 exists in three overlapping BSSs (BSS1-BSS3); STA3 exists in two overlapping BSSs (BSS1 and BSS3); STA4 exists in two overlapping BSSs (BSS2 and BSS3); and STA5 exists in a single BSS (BSS2).

In the FIG. 1, although STA2 is associated with AP3, the three APs (AP1, AP2 and AP3) may coordinate their transmission to simultaneously transmit to STA2. This simultaneous transmission increases the SINR level at STA2 and facilitates the use of higher MCS which translates to higher throughput for STA2.

Although Multi-AP Coordination schemes typically utilize some sort of time synchronization among the participating APs, the level of synchronization utilized is highest for Joint Transmission, especially for Distributed MU-MIMO. Due to this, one or more example embodiments implement Joint Transmission in which one AP (called the Master AP) provides the synchronization signal and the other participating APs (called Slave APs) are in range of the Master AP. In FIG. 1, AP3 would be the Master AP while AP1 and AP2 are Slave APs. The Master AP may also be known by alternate names such as Coordinating AP, or Joint Transmission (JT) AP, or a multi-AP Controller etc., while the Slave AP may also be known as multi-AP device, or coordinated AP, etc.

In an example embodiment and as discussed in more detail below, Joint Transmission includes all participating APs to transmit the same signal to the STA. This includes the MAC layer specific fields be equivalent with all participating APs.

Figure 2A:
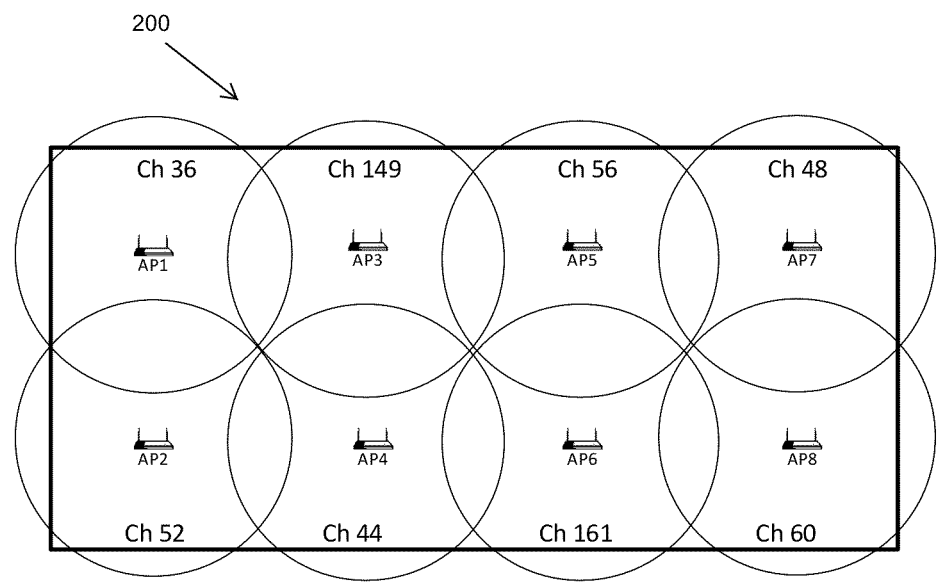
FIG. 2A is a multi-AP system shown as an enterprise network in accordance with an example embodiment.

FIG. 2A is a multi-AP system 200 shown as an enterprise network in accordance with an example embodiment. By way of example, the system includes multiple APs (shown as AP1-AP8) broadcasting with overlapping transmissions. Each AP operates a respective channel (Ch), such as AP1 at Ch 36, AP2 at Ch 52, AP3 at Ch 149, AP4 at Ch 44, AP5 at Ch 56, AP6 at Ch 161, AP7 at Ch 48, and AP8 at Ch 60.

In enterprise networks, APs position and frequency allocation are carefully planned during deployment to maximize capacity. As shown in FIG. 2A, adjacent APs use non-overlapping channels to minimize inter-BSS interference. APs can use high gain directional antennas with narrow beam width. Adjacent APs may not be in wireless range of each other. Multiple APs or all APs can use the same Service Set Identifier (SSID). Further, APs are connected using Ethernet and may be configured and/or controlled by a central AP Controller. Most edge STAs would be within coverage of at least two APs. AP to AP communication can use, for example, Ethernet or out-of-band Mesh wireless direct links. Even though neighboring APs are allocated non-overlapping primary channels, when wide-band channels are used it is inevitable that inter-BSS interference will be present in the OBSS zones. Since most enterprise networks are centrally managed and coordination among APs is easier and hence enterprise networks are a prime candidate for a Joint Transmission systems.

Figure 2B:
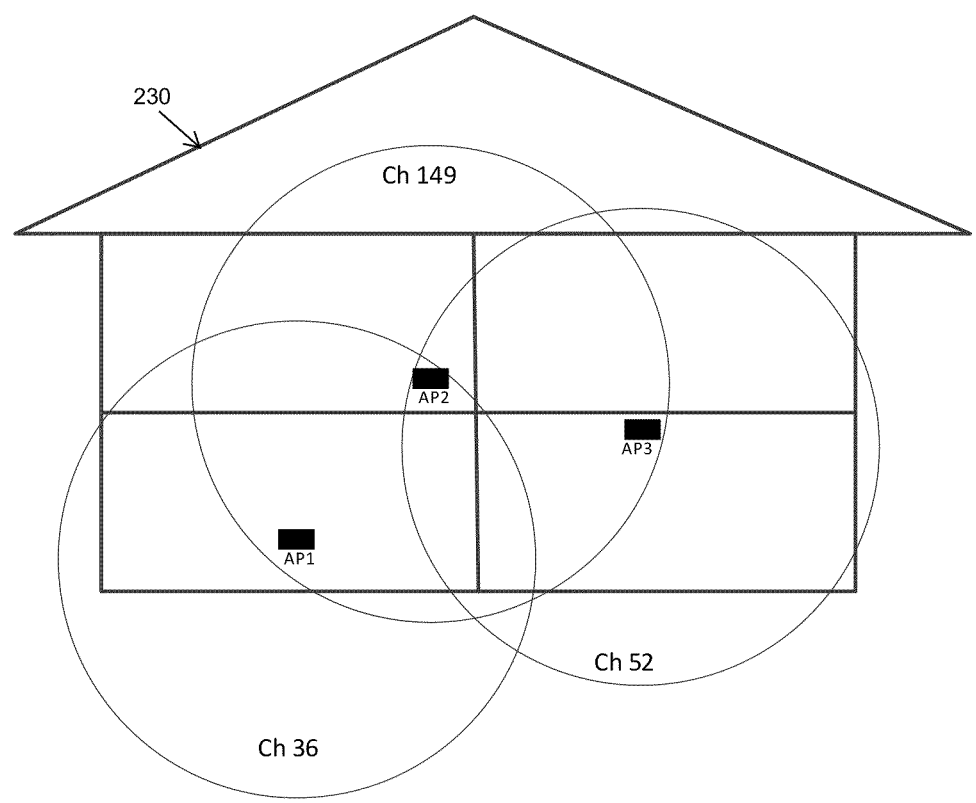
FIG. 2B is a multi-AP system shown as a home or office network in accordance with an example embodiment.

FIG. 2B is a multi-AP system 230 shown as a home or office network in accordance with an example embodiment. By way of example, the system includes multiple APs (shown as AP1-AP3) broadcasting with overlapping transmissions. Each AP operates a respective channel, such as AP1 at Ch 36, AP2 at Ch 149, and AP3 at Ch 52.

Multi-AP systems (e.g. Wi-Fi EasyMesh) is an example configuration to provide Wi-Fi coverage across an entire area, such as a house or office. AP position and frequency allocation are planned to maximize coverage. For example, one AP may act as a Multi-AP controller while the rest of the APs act as Multi-AP agents. APs can be expected to be in wireless coverage of at least one other AP. A Backhaul BSS is setup for AP to AP signaling. The Backhaul BSS may use a different SSID from the fronthaul SSID. Most edge STAs would be within coverage of at least two APs. Furthermore, AP to AP communication can use wireless direct links or a mix of wireless and wired links. Such multi-AP home or small office networks are also a good candidate for a Joint Transmission systems.

Figure 2C:
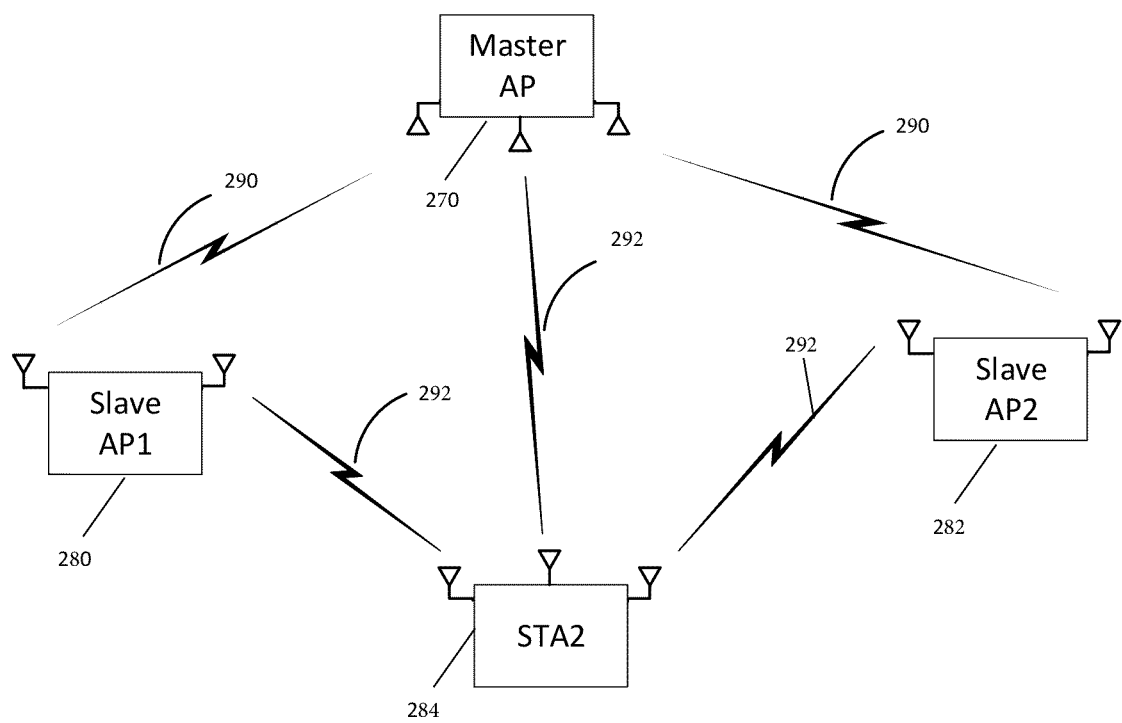
FIG. 2C is a multi-AP system shown as a Master-Slave configuration in accordance with an example embodiment.

FIG. 2C is a multi-AP system 260 shown as a Master-Slave configuration in accordance with an example embodiment. By way of example, the system includes a Master AP 270, two Slave APs 280 and 282, and a STA 284. AP to AP communication occurs over links 290, and communication between APs and the STA occurs over links 292.

For Joint Transmission, the APs possess the transmission data (upper layer data) that is to be jointly transmitted to a STA prior to the actual Joint Transmission. In one or more example embodiments, however, possessing the transmission data may not be enough in order to realize the SINR gains of Joint Transmission. The actual data symbols that are transmitted on the air need to be synchronized among the participating APs, such as multiple APs or all APs. This means that the PHY layer and MAC layer processing of the transmission data are the same among the participating APs. Example embodiments include systems, apparatus, and methods to distribute and synchronize the data for Multi-AP Joint Transmission.

In one or more example embodiments, Joint Transmission takes place in two phases: Distribution of JT data to Slave APs and Joint Transmission to the Target STA.

In the first phase (Distribution of Joint Transmission Data to Slave APs), the data to be jointly transmitted is distributed to the participating Slave APs prior to the actual joint transmission over the AP to AP link, such as link 290 in FIG. 2C. The distribution may take place over the wireless backhaul link between the APs, or it may also happen over wired backhaul link between the APs, e.g., Ethernet. When wireless backhaul is used, prior to initiating Joint transmission, the Slave APs may have associated with the Master AP on a separate BSS setup by the Master AP for the purpose of communication among the APs. The wireless channel used for the backhaul link among APs may be different from the fronthaul link between the APs and the Target STA.

In the second phase (Joint Transmission to the Target STA), actual joint transmission by two or more participating APs to the Target STA occurs over a link, such as wireless links 292 in FIG. 2C. The joint transmission may be preceded by a synchronization signal from the Master AP over the link 290, which may be called the Slave Trigger frame or the Joint Transmission (JT) Trigger frame. In some scenarios, the Master AP may also participate in the joint transmission while in some scenarios the Master AP may not take part in the joint transmission but only the Slave APs may participate. Different Sets of APs may be involved in joint transmissions to different Target STAs.

Figure 3:
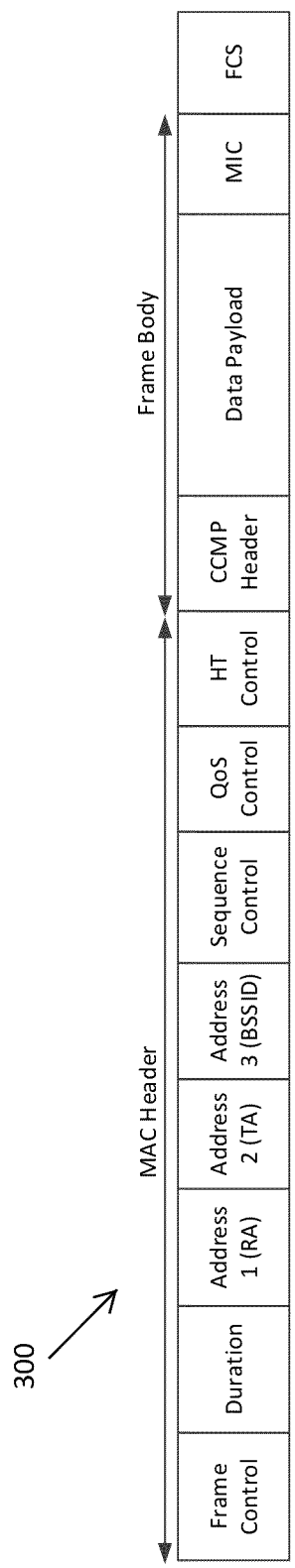
FIG. 3 is MAC Protocol Data Unit (MPDU) in accordance with an example embodiment.

FIG. 3 is MAC Protocol Data Unit (MPDU) 300 to be jointly transmitted in accordance with an example embodiment. The MPDU includes a MAC Header and a Frame Body. The MAC Header includes Frame Control, Duration, Address 1 (Receiver Address), Address 2 (Transmitter Address), Address 3 (BSSID), Sequence Control, QoS Control, and HT Control. The Frame Body includes Data Payload, MIC, and FCS. The Address 3 field carries the BSSID if the Data frame carries an A-MSDU, otherwise the Address 3 field carries the Source Address (SA) i.e. the MAC address of the device that is the source of the Data payload.

In order to realize the SINR gains of Joint Transmission, the actual data symbols that are transmitted on the air are synchronized among the participating APs. Further, the PHY layer and MAC layer processing of the transmission are the same among the participating APs. Typically, for normal transmissions (e.g., non-joint transmissions), the upper layer (e.g., IP layer) passes the data payload (e.g., IP packets) to be transmitted to the MAC layer which performs the MAC layer processing, such as pre-pending the MAC headers, adding FCS, MAC padding if required, etc. to create the MPDU (MAC Protocol Data Unit) 300. If protection is enabled, the data payload may be further subjected to encryption procedure which results in the addition of the CCMP Header field and the MIC fields to the MAC frame body. The MPDU is then passed down to the PHY layer for PHY layer processing such as pre-pending the PHY preamble, applying PHY encodings, adding PHY padding etc. to create the PPDU (PHY Protocol Data Unit) and finally transmitting the PPDU out on the air.

For Joint Transmission, participating APs need to be aware of the MAC and PHY parameters to be applied to the data payload. In addition, at the MAC layer, there are several fields that are locally generated. While some fields like Frame Control, Address 2 (TA), Address 3 (BSSID), QoS Control, HT Control may be overwritten by the MAC layers of the Slave APs to match the fields generated by the Master APs, some fields like Sequence Control, CCMP Header are different for each MPDU and are typically generated locally at each AP; hence such fields are more difficult to synchronize among the APs. In addition, more than one MPDU may also be aggregated at the MAC layer to form the A-MPDU (Aggregated MPDU), or one MPDU may constitute a S-MPDU (Single MPDU). In order to synchronize the data to be jointly transmitted among the MAC layers of all participating APs, the Master AP may generate and distribute the actual MAC layer A-MPDU or S-MPDU to all the participating Slave APs. The Sequence Control field in the MPDUs are also generated by the Master AP and the same number space is used for the Sequence Number sub-field of the Sequence Control field for both direct transmission (i.e. sing AP transmission) from the Master AP to the Target STA as well as for joint transmissions. If encryption is enabled, the Master AP also encrypts the Data payload and appends the MIC field. In this case, the Joint Transmission (JT) Data refers to the MAC layer data that is to be jointly transmitted.

In some cases, the Master AP may not be involved in the actual joint transmission phase (e.g., only the Slave APs may participate in the joint transmission). This may happen when the Master AP is implemented as a central controller and is far from the Target STA. In this case, the Target STA would be associated with one of the Slave APs and not the Master AP.

In such cases where the Target STA is associated with a Slave AP, during the data distribution phase, the Master AP sets the MAC header fields of MPDU 300 such that the MPDU appears to be generated by the Slave AP with which the Target STA is associated, e.g., the Address 2 (TA) field and Address 3 (BSSID) are set to the MAC address of the Slave AP. The Master AP also queries the Slave AP for the next Sequence Control to be used, and optionally the CCMP Packet Number (PN) and encryption Key ID to be used for transmission to the Target STA and sets the fields of the MPDU 300 respectively. The Sequence Control field in the MPDUs in this case are generated by the Slave AP and the same number space is used for the Sequence Number sub-field of the Sequence Control field for both direct transmission (i.e. sing AP transmission) from the Slave AP to the Target STA as well as for joint transmissions.

Figure 4:
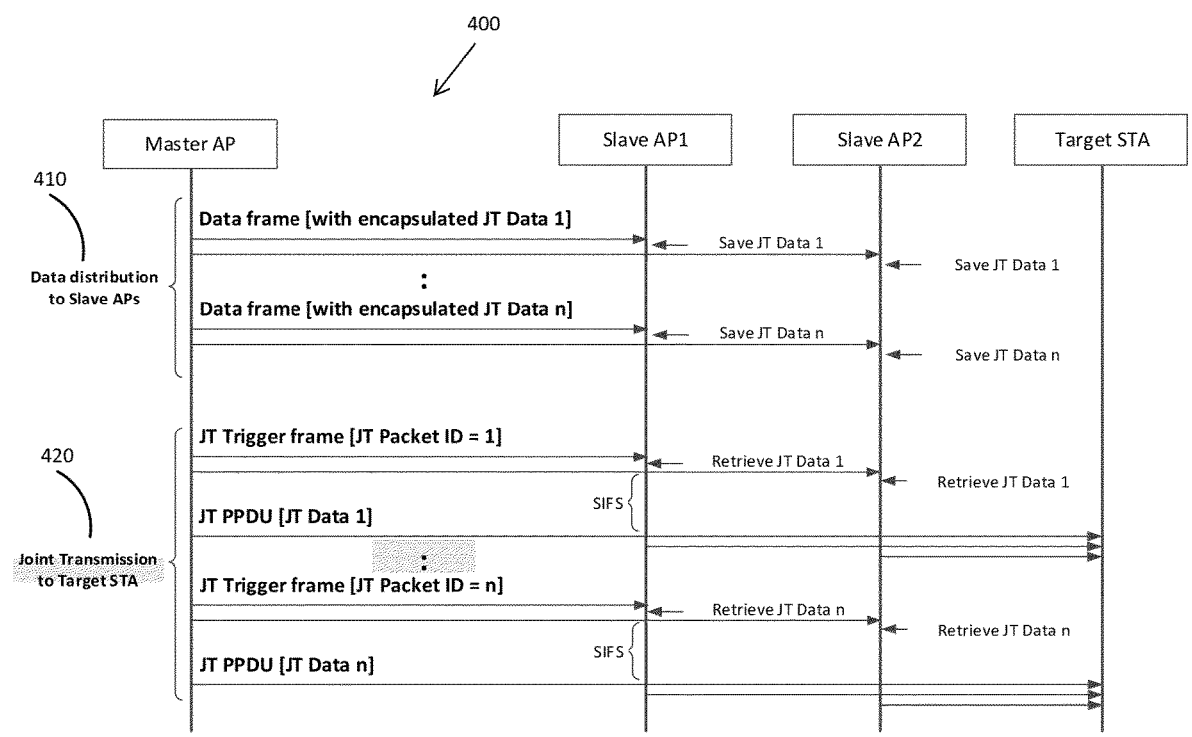
FIG. 4 is a message sequence in Joint Transmission in a multi-AP system in accordance with an example embodiment.

FIG. 4 is a message sequence 400 in Joint Transmission in a multi-AP system in accordance with an example embodiment.

In a distributed wireless network, such as 802.11 WLANs, the access to the wireless channel is controlled by CSMA/CA, and it is difficult to predict the exact transmission times. Similarly, transmission failures and re-transmissions make it difficult to maintain the order of transmission. Due to this, for Joint Transmissions, it may be advantageous to de-couple the data distribution phase and the joint transmission phase.

As shown in FIG. 4, Joint Transmission occurs in two phases: Distribution of Joint Transmission data to Slave APs and Joint Transmission to one or more Target STAs. In the first phase, one or more Joint Transmission Data are distributed to Slave APs (e.g., over a wireless backhaul). Each Joint Transmission Data is assigned a unique ID. In the second phase, the Master AP initiates the Joint Transmission by transmitting the JT Trigger frame. This frame carries the Unique ID that identifies the Joint Transmission Data to be jointly transmitted by all participating APs.

FIG. 4 shows an example message sequence involved in a joint transmission in which the data distribution phase 410 is de-coupled from the joint transmission phase 420. During the data distribution phase 410, the Master AP distributes one or more Joint Transmission (JT) Data to the Slave APs. The JT Data in this case may be the actual S-MPDU or A-MPDU to be jointly transmitted and is encapsulated in another Data frame addressed to the Slave APs. To reduce the overhead of distributing the JT Data, the encapsulating Data frame may be transmitted to Slave APs as groupcast transmission instead of unicast transmissions. The Master AP may also use Multi-user (MU) PPDU format to simultaneously distribute different JT Data to different Slave APs.

In order to uniquely identify each JT Data, the Master AP also assigns a unique ID which may be called a JT Packet ID, to each JT Data. Each Slave AP, upon receiving the encapsulated JT Data, de-encapsulates and saves the JT Data in local memory indexed by the JT Packet ID. To ensure that the Slave AP saves the JT Data instead of forwarding it immediately to the Target STA, the data frame that encapsulates the JT Data can be addressed to the Slave AP by setting the RA to the MAC address of the Slave AP. If the four-address MAC Header is used for the Data frame to Slave APs, both the RA (Address 1) and DA (Address 3) can be set to the Slave AP's MAC address. Due to the stringent time synchronization requirement for Joint Transmission and for faster retrieval, the JT Data frame may be saved in a separate memory (e.g., different from the local EDCA queues).

In the Joint Transmission phase 420, the Master AP initiates the Joint transmission by transmitting the JT Trigger frame to the Slave APs. The JT Trigger frames provide time synchronization to the Slave APs. In addition, the JT Trigger frame also carries the JT Packet ID of the JT Data to be jointly transmitted. Each Slave AP, upon receiving the JT Trigger frame, retrieves the JT Data from local memory corresponding to the JT Packet ID and transmits the JT PPDU constructed from the JT Data.

Figure 5A:
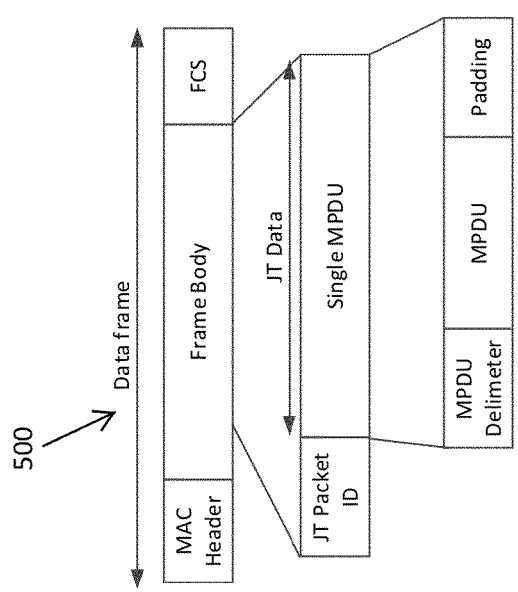
FIGS. 5A and 5B are Data frames used to encapsulate JT Data in accordance with an example embodiment.
Figure 5B:
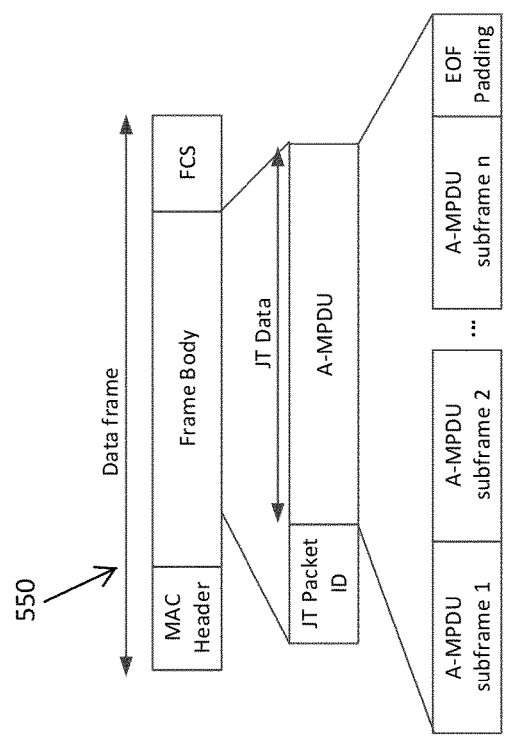

FIGS. 5A and 5B are Data frames used to encapsulates JT Data in accordance with an example embodiment.

FIG. 5A shows a Data frame 500 transmitted by the Master AP that encapsulates JT Data, which in this case is an S-MPDU, within the frame body of the data frame 500. The S-MPDU is composed of a MPDU Delimiter, the actual MPDU and padding if required. A unique ID (JT Packet ID) is assigned to each Joint Transmission Data. In this case, the JT Packet ID uniquely identifies the S-MPDU.

FIG. 5B shows a Data frame 550 transmitted by the Master AP that encapsulates JT Data, which in case is an A-MPDU, within the frame body of the data frame 550. The A-MPDU is composed of two or more A-MPDU subframes, and EOF (End-of-frame) padding if required. Each A-MPDU subframe shares the same format as an S-MPDU. In this case, the JT Packet ID uniquely identifies the A-MPDU.

If encryption is enabled, each of the MPDUs in the JT Data is also encrypted by the Master AP before encapsulating in the Data frame 500 or 550.

Each Slave AP, upon receiving the encapsulated JT Data, de-encapsulates and saves the JT Data in local memory indexed by the JT Packet ID. Due to the stringent time synchronization requirement for Joint Transmission, for faster retrieval the JT Data frame may be saved in a separate memory (e.g., different from the local EDCA queues).

The Slave APs do not immediately forward the received JT Data to the Target STA(s). To ensure this, if the four-address MAC Header is used for the Data frame to Slave APs, both the RA (Address 1) and DA (Address 3) are set to the Slave AP's MAC address.

Figure 6:
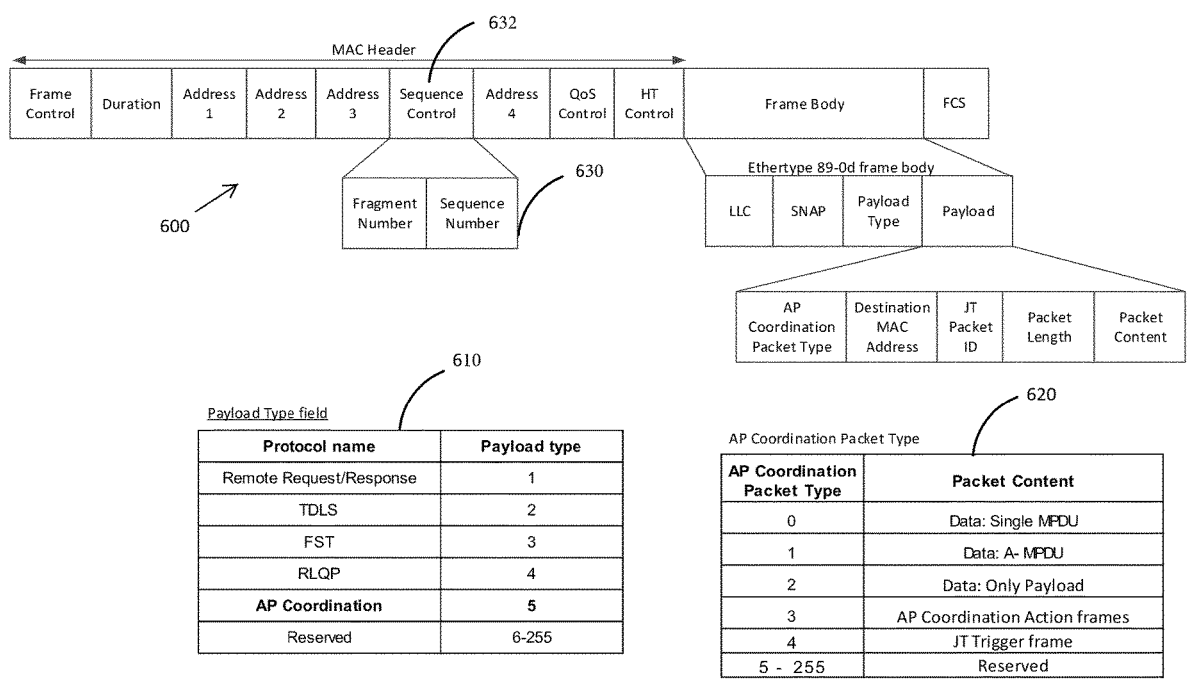
FIG. 6 shows a data frame, a first table showing protocol names and payload types, and a second table showing AP coordination packet type in accordance with an example embodiment.

FIG. 6 shows a data frame 600, a first table 610 showing encoding of the payload type field, and a second table 620 showing encoding of the AP coordination packet type field in accordance with an example embodiment.

The Data frame 600 encapsulates JT Data during the Data distribution phase (e.g., discussed at 410 in FIG. 4). In this example, the frame body of the data frame 600 carries an Ethertype 89-0d frame with the Payload Type field set to 5 "AP Coordination" to differentiate from other encapsulation types. Ethertype 89-0d is the Ethertype originally assigned for encapsulation of IEEE 802.11 frames within Ethernet frames. The Payload of the Ethertype 89-0d frame when the Payload Type is set to "AP Coordination" may carry the JT Data within the Packet Content field when the AP Coordination Packet Type field is set to 0, 1 or 2 as indicated in Table 620. The Destination MAC Address carries the MAC Address of the Target STA (e.g., target of the Joint Transmission). The JT Packet ID is the unique ID assigned to the JT Data while the Packet Length field indicates the size of the JT Data carried in the Packet Content field. When 802.11 Data frames are exclusively used to encapsulate the JT Data, the Sequence Number subfield 630 in the Sequence Control field 632 of the host 802.11 data frame may be used as an implicit JT Packet ID, and the JT Packet ID field may be omitted in the Ethertype 89-0d frame body.

To ensure that the Slave APs save the JT Data instead of forwarding it immediately to the Target STA, the data frame 600 that encapsulates the JT Data is addressed to the Slave AP by setting the RA field of the MAC Header to the MAC address of the Slave AP. If the four-address MAC Header is used, both the RA (Address 1) and DA (Address 3) are set to the Slave AP's MAC address.

Figure 7:
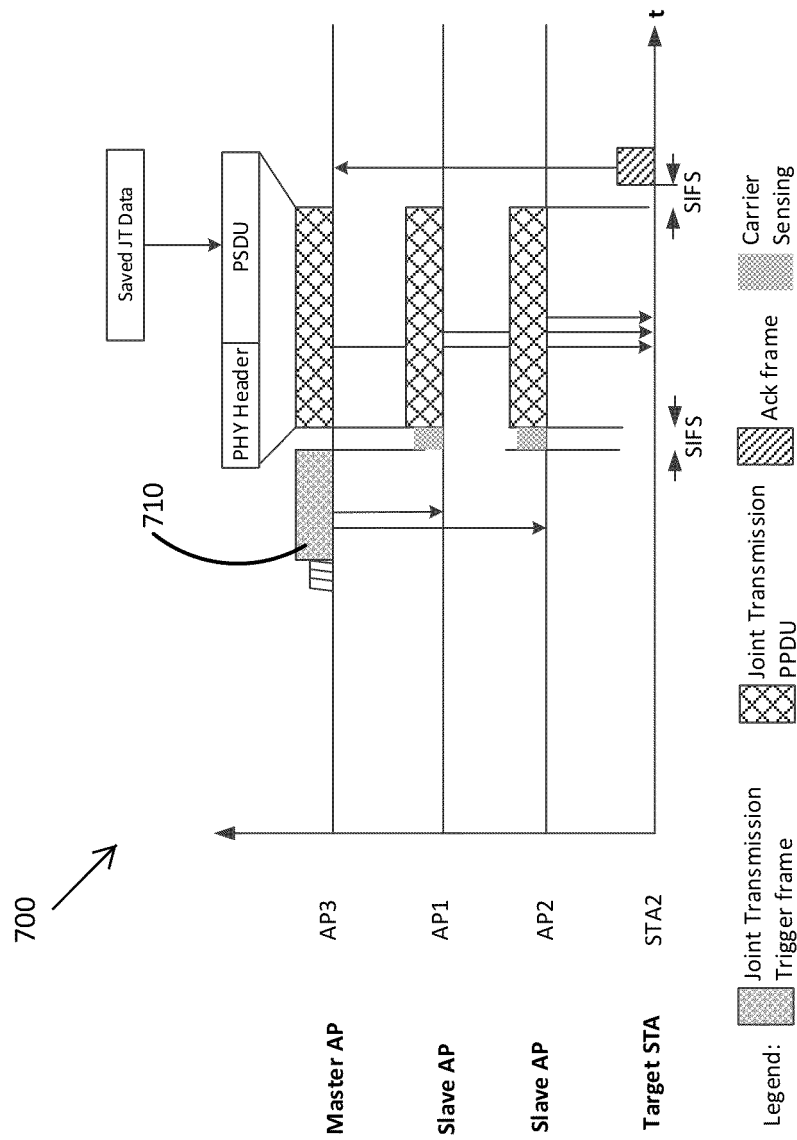
FIG. 7 shows joint transmission between a Master AP, Slave APs, and a Target STA in accordance with an example embodiment.

FIG. 7 shows joint transmission 700 between a Master AP, Slave APs, and a Target STA in accordance with an example embodiment.

In the Joint Transmission phase (e.g., discussed at 420 in FIG. 4), the Master AP initiates the Joint transmission by transmitting the JT Trigger frame 710 to the Slave APs. In addition to PHY and MAC parameters used for synchronization, the JT Trigger frame also carries the JT Packet ID of the JT Data to be jointly transmitted. Each Slave AP's MAC layer, upon receiving the JT Trigger frame that identifies the Slave AP as a participating AP in the joint transmission, retrieves the JT Data from local memory corresponding to the JT Packet ID and passes down to the PHY layer which constructs the JT PPDU from the JT Data before transmitting its SIFS (Short Interframe Space) after the end of the JT Trigger frame. The Master AP too constructs the JT PPDU from the JT Data corresponding to the JT Packet ID and transmits the JT PPDU SIFS (Short Interframe Space) after the end of the JT Trigger frame. Since the channel states may be different at different APs, each Slave APs may need to consider the channel condition and transmit the JT PPDU only if the channel is considered idle during the SIFS after the end of the JT Trigger frame, except that NAV (Network Allocation Vector) set due to Master AP's or Target STA's transmissions may be ignored. As for the Target STA, upon receiving the JT Data, it may not even be aware that multiple APs were involved in the transmission. As far as the Target STA is concerned, this is just another transmission to it from the Master AP, or the AP whose MAC Address appears in the TA address (Address 2) field of the frame. If the reception is successful, the Target STA proceeds to transmit the acknowledgement frame (ACK or Block Ack) to the AP whose MAC Address appears in the TA address (Address 2) field.

Figure 8:
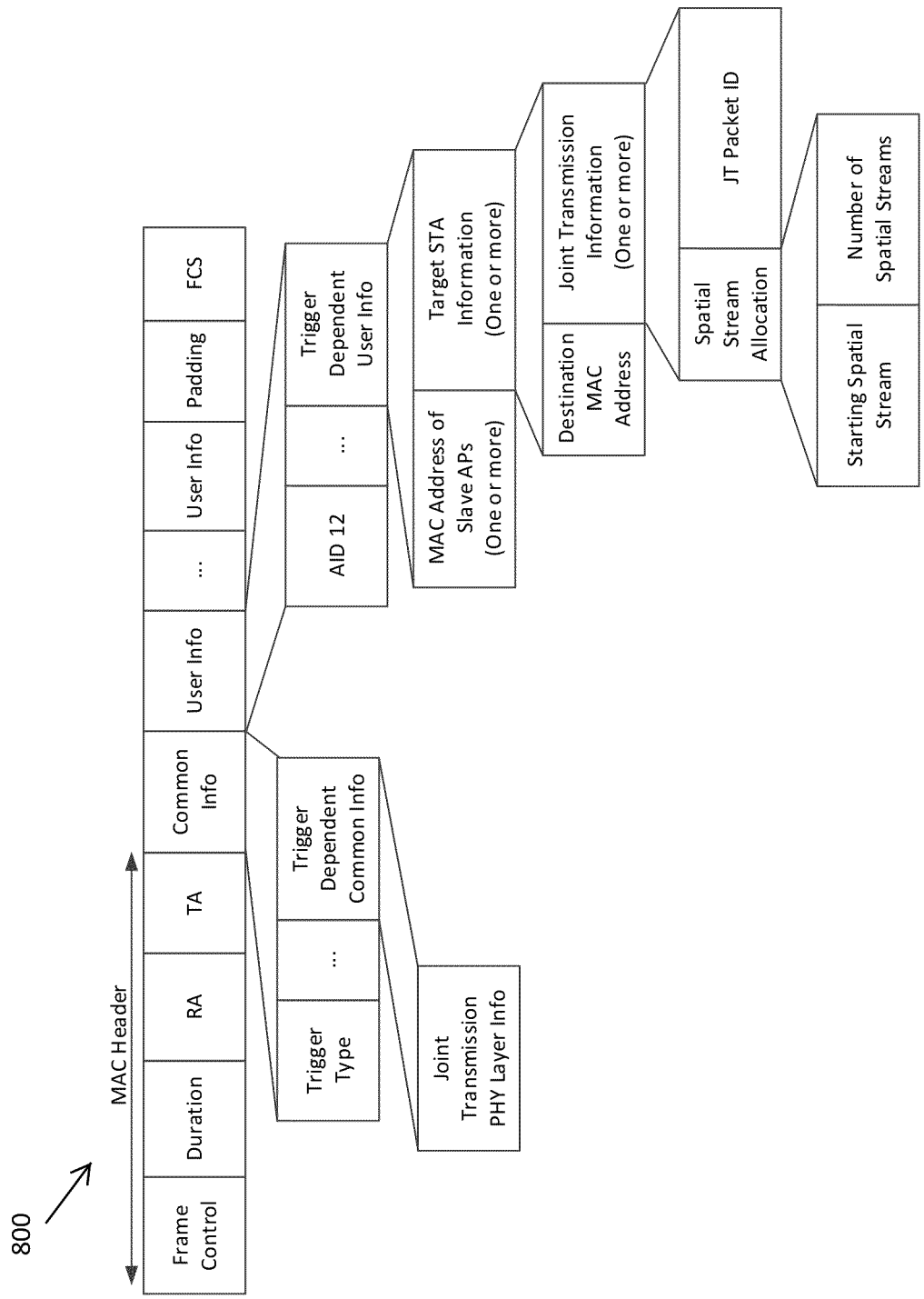
FIG. 8 is a JT Trigger frame in accordance with an example embodiment.

FIG. 8 is a JT Trigger frame 800 in accordance with an example embodiment. Each User Info field carries information of a set of Slave APs and Target STAs.

The MAC Address of Slave APs field identifies the Slave APs participating in the Joint Transmission for a particular set of STAs. If only a single Slave AP is involved in the Joint Transmission, this may be omitted and the Slave AP is identified by the RA field in the MAC header. The AID12 field within each user Info field may be set to a special value (e.g. 2047) to differentiate the JT Trigger frame from the other Trigger frames used to solicit uplink OFDMA transmissions.

The JT Packet ID field identifies the (stored) MPDUs to be carried in the JT PPDU. In case of S-MPDU this may also be the value of the Sequence Control field of the S-MPDU. The field value may be same for different Slave APs if identical data is to be jointly transmitted (transmit diversity). Alternatively, the field value may be different for different Slave APs when different data are to be jointly transmitted (D-MIMO).

In addition, the Joint Transmission PHY Layer Info specifies the additional PHY parameters to be used for encoding of the JT PPDU. The Target STA Information carries information relevant for Joint Transmission to one or more Target STAs by the Slave AP. The Joint Transmission Information identifies the stored data to be transmitted and the spatial stream for the Target STA.

Further, the Spatial Stream Allocation field indicates the spatial streams allocated for each Target STA and is only present in the case of MIMO joint transmissions. The Starting Spatial Stream field indicate the first spatial stream allocated to the STA, while the Number of Spatial Streams field indicate the total number of consecutive spatial streams, including the first spatial stream, allocated to the STA.

Figure 9:
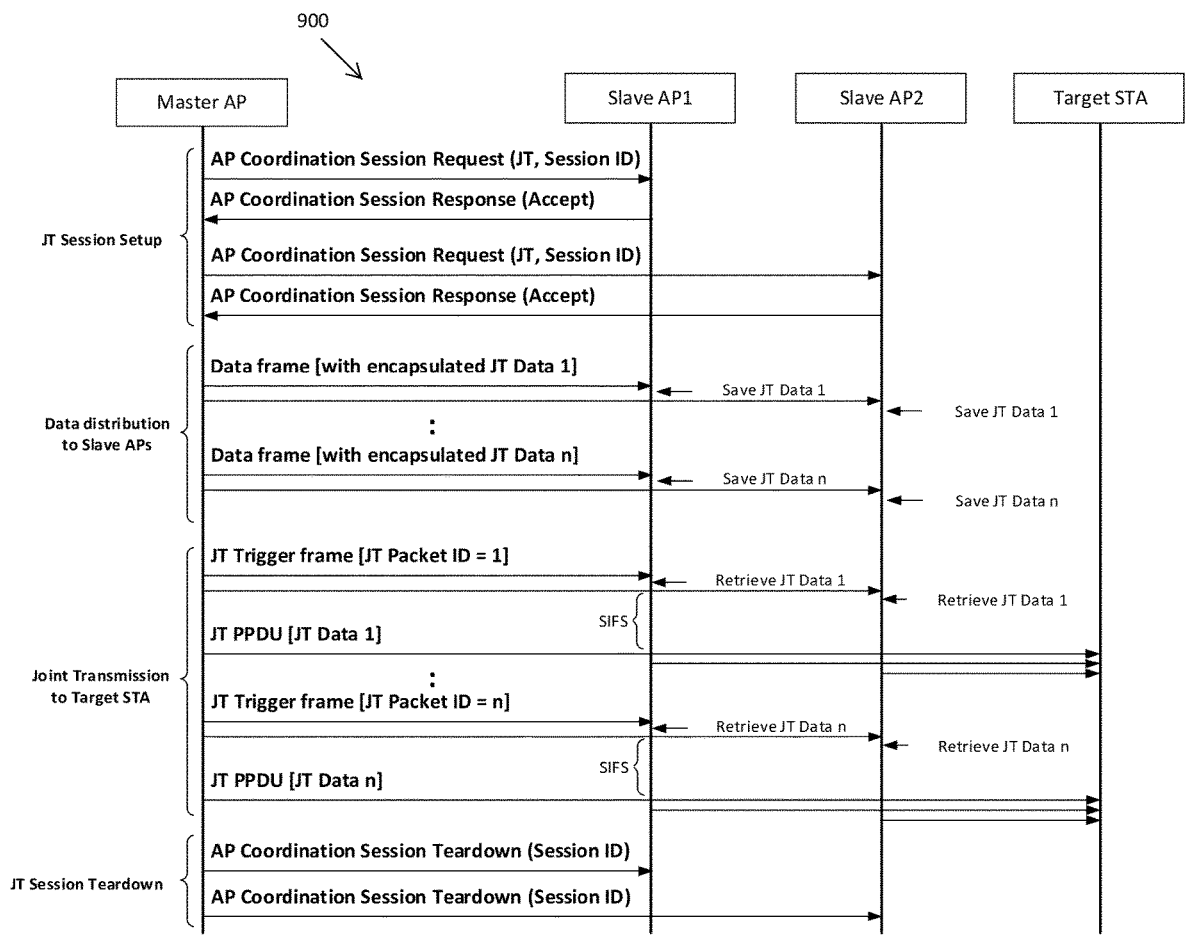
FIG. 9 is a message sequence for a Joint Transmission Session between a Master AP and Slave APs in a multi-AP system in accordance with an example embodiment.

FIG. 9 is a message sequence 900 for a Joint Transmission Session between a Master AP and Slave APs in a multi-AP system in accordance with an example embodiment.

If the joint transmission is expected to take place for more than one or two frames, an example embodiment sets up a joint transmission session between the Master AP and the participating Slave APs prior to the actual joint transmission. During the joint transmission session negotiation, the Master AP and Slave APs exchange information about the Target STAs involved in the joint transmission. The Master AP and Slave APs also specify the joint transmission parameters that are expected to be used throughout the session, for example the channel to be used, the PPDU format (HT, VHT or HE etc.), pre-coding schemes for MU-MIMO etc. Each joint transmission session is identified by a unique Session ID. The Master AP initiates the setup of a joint transmission session by transmitting an AP Coordination Session Request frame to a Slave AP. If the Slave AP accepts the request, it transmits back an AP Coordination Session Response frame, with the Status code field set to Accept, to the Master AP. The Master AP repeats the process for each Slave AP participating in the joint transmission. To terminate a session, the Master AP transmits the AP Coordination Session Teardown frame to a Slave AP.

Figure 10:
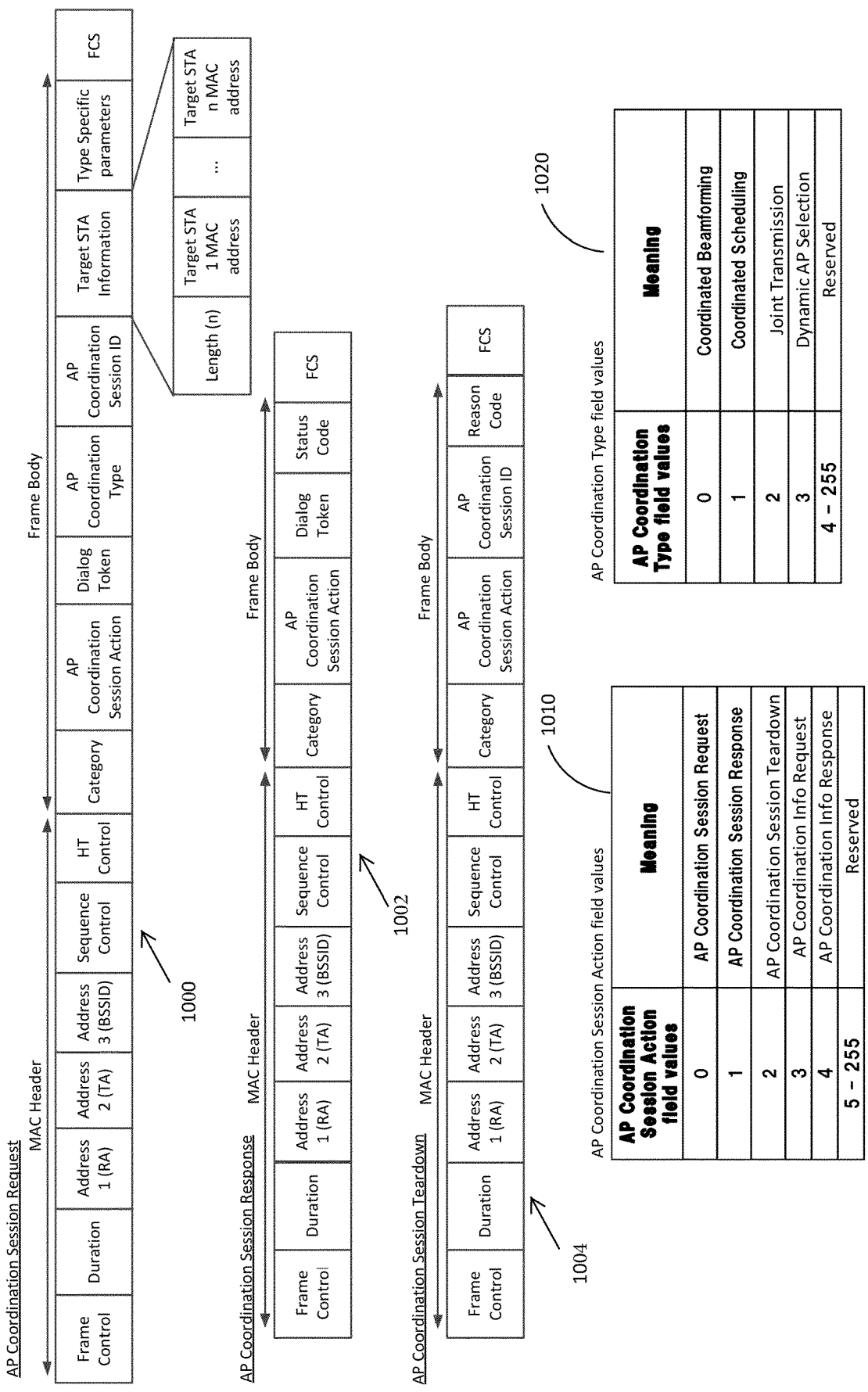
FIG. 10 shows AP Coordination Action frames exchanged over the air to negotiate or tear down a Joint Transmission Session in accordance with an example embodiment.

FIG. 10 shows AP Coordination Action frames exchanged between the AP to negotiate or to teardown joint transmission sessions in accordance with an example embodiment. The figure shows an AP Coordination Session Request 1000, an AP Coordination Session Response 1002, an AP Coordination Session Teardown 1004, a table 1010 with AP Coordination Session Action field values, and a table 1020 with AP Coordination Type field values.

A new category of Action frames is defined for Multi-AP Coordination and indicated in the category field. Five new Action frames are defined for the purpose of AP to AP communication related to Multi-AP Coordination, out of which three are used for setup/teardown of sessions (indicated by the value of the "AP Coordination Session Action" field as listed in table 1010). Sessions may be setup for various types of multi-AP coordination schemes and is indicated by the value of the "AP Coordination Type" field in the AP Coordination Session Request frame as listed in table 1020. For example, for joint transmission sessions, it is set to 2. The "Target STA information" field in the AP Coordination Session Request frame 1000 lists the MAC Addresses of one or more Target STAs that are expected to participate in the joint transmission.

The "Type Specific parameters" field in the AP Coordination Session Request frame 1000 carries additional session parameters that are specific to the AP Coordination Type. For example, for Joint Transmission, the field may specify the Channel information for the joint transmission. The channel information may be present when the Master AP and Slave APs are operating on different fronthaul channels. The "Type Specific parameters" field may also indicate the start time at which the joint transmission is expected to start. In dense networks it is common for neighboring APs to operate on different channels to mitigate inter-BSS interference. If the channel specified in the Channel information is different from a Slave AP's operating channel and if the Slave AP accepts the AP Coordination session request, the Slave AP is expected to switch channel to the specified joint transmission channel before the indicated joint transmission start time.

As another example, for Joint Transmission, if encryption is enabled for joint transmission, and encryption is to be performed locally at each AP, the "Type Specific parameters" field may also include the security key (e.g. PTK) to be used for the encryption.

As yet another example, for Joint Transmission, the "Type Specific parameters" field may also include the amount of buffer space requested by Master AP to be allocated by Slave APs to save JT Data frames.

Figure 11:
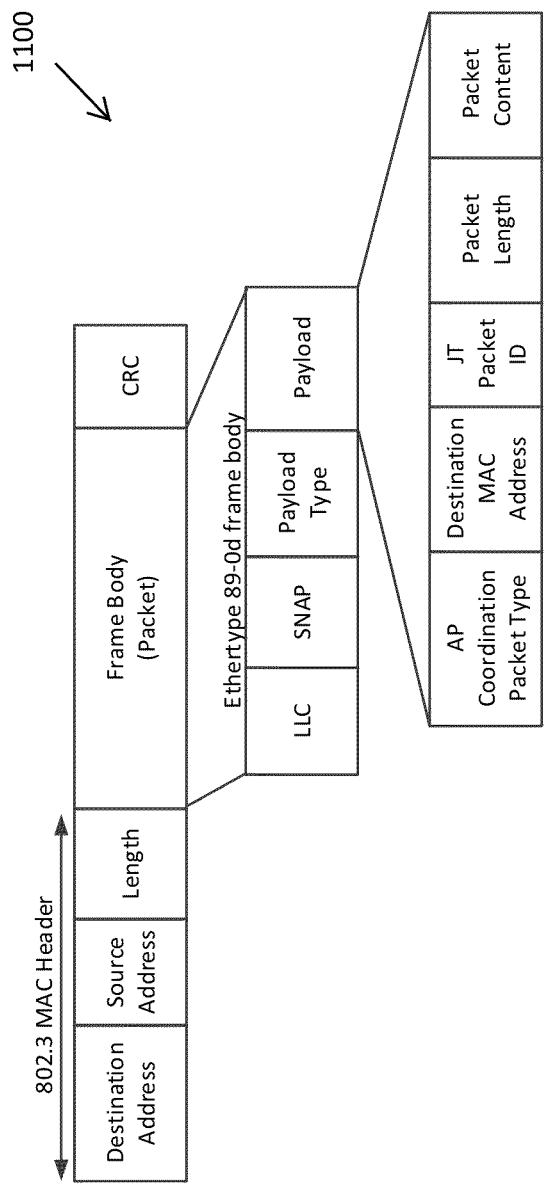
FIG. 11 shows a frame in which an Ethernet Frame encapsulates JT Data as well AP Coordination Action frames in accordance with an example embodiment.

FIG. 11 shows a frame 1100 in which an Ethernet Frame encapsulates JT Data as well AP Coordination Action frames in accordance with an example embodiment.

The Master AP encapsulates the Joint Transmission Data frame (entire S-MPDU or A-MPDU carrying the Joint Transmission Data payload) within an 802.3 (Ethernet) frame and transmits to the slave APs over the Ethernet link. If encryption is to be used, the encrypted frame/s are encapsulated.

When Ethernet frames are used to exchange AP Coordination information between APs, Ethertype 89-0d frames may also be used to encapsulate the AP Coordination Action frames, for example to setup or teardown a AP Coordination session. In this case, the Payload Type field is set to "AP Coordination" and the Ethertype 89-0d frame payload carries AP Coordination Action frames. The "AP Coordination Packet Type" field in this case is set to AP Coordination Action frames (set to 3 as indicated in Table 620 in FIG. 6) and the Packet Content field carries the AP Coordination Action frames, while the other fields in the payload are omitted.

The Destination Address in the MAC Header ensures that Slave APs do not forward the received JT Data frames to Target STAs immediately. For example, the sub-field is set to the Slave AP's MAC address and not to the Target STA's MAC address.

The transmissions to different Slave APs may not be synchronized in time in wired or mixed backhaul scenario and may happen at the same time or at different times. The JT Packet ID is used to synchronize the Joint Transmission content.

Figure 12:
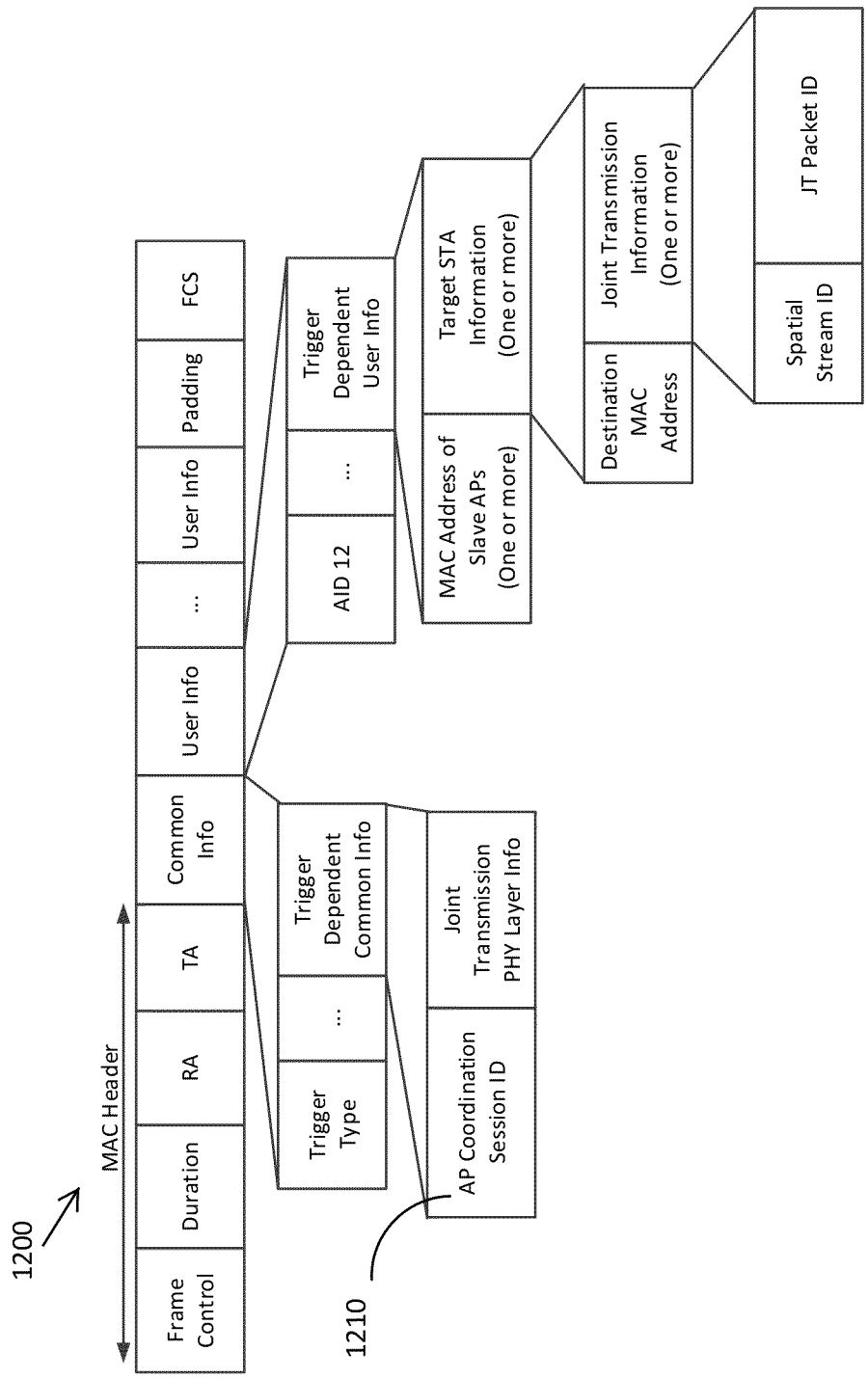
FIG. 12 shows a Trigger frame for Joint Transmission to a Target STA in accordance with an example embodiment.

FIG. 12 shows a Trigger frame 1200 for Joint Transmission to a Target STA in accordance with an example embodiment.

The Joint Transmission Trigger frame 1200 includes the AP Coordination Session ID 1210. The session ID is included in the JT Trigger frame to indicate which joint transmission session is being triggered. Based on the session ID, the slave APs receiving the JT Trigger frame retrieves the common parameters that were negotiated during the session setup. Such pre-negotiated parameters are omitted in the JT Trigger frame unless the Master AP explicitly overrides any of the parameters. Overhead of joint transmission control signaling over the wireless medium is reduced.

Further, the field MAC Address of Slave APs can be skipped if all Slave APs corresponding to a Session ID are involved in the Joint Transmission. The Destination MAC Address field may also be skipped if the Target STA is obvious from the Session ID.

Figure 13:
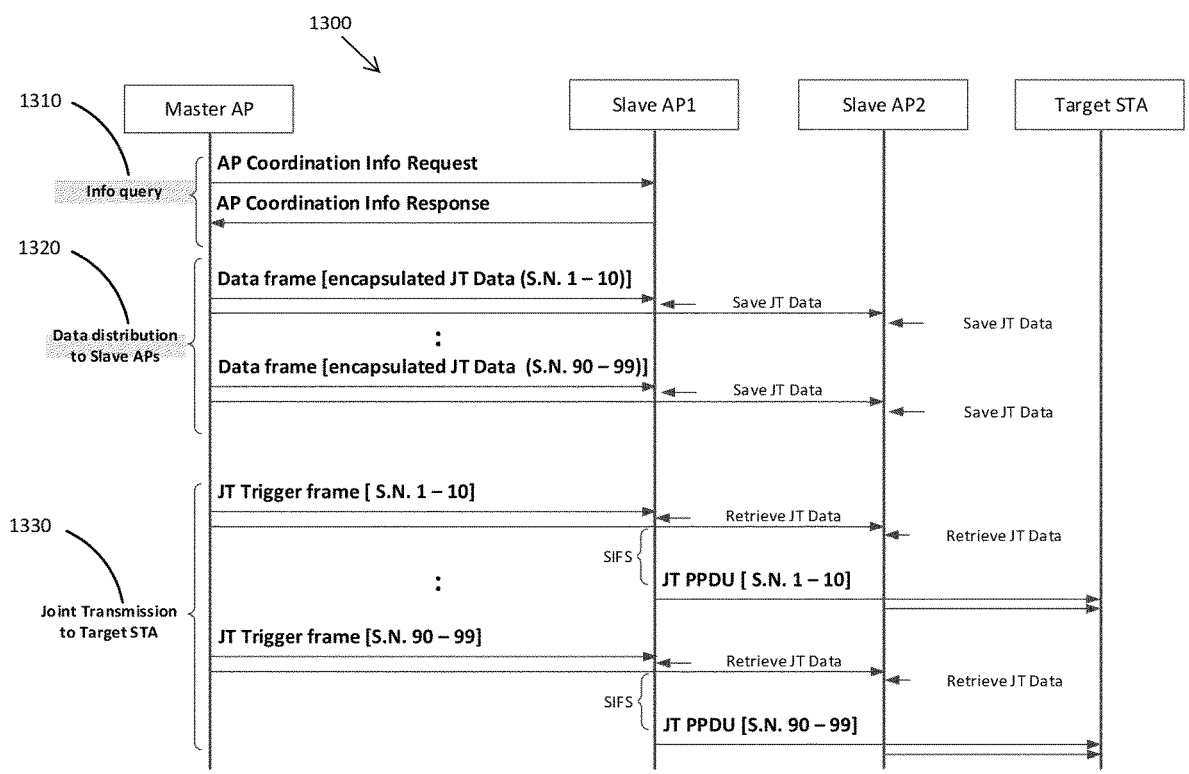
FIG. 13 shows a communication exchange in which the Master AP does not participate in the Joint Transmission in accordance with an example embodiment.

FIG. 13 shows a communication exchange 1300 in which the Master AP does not participate in the Joint Transmission in accordance with an example embodiment.

As mentioned earlier, in some cases, the Master AP may not be involved in the actual joint transmission phase, only the Slave APs may participate in the joint transmission. This may happen when the Master AP is implemented as a central controller and is far from the Target STA, or the Master AP may not even be an actual AP and may be a Multi-AP controller device in the core network. In this case, the Target STA is associated with one of the Slave APs and not the Master AP. Communications between the Slave APs and Master AP, including the JT Trigger frame, may happen over the wired backhaul (e.g. Ethernet). When there is no wireless link between the Master AP and the Slave APs, even the JT Trigger frames are encapsulated within Ethernet frames. Due to the stringent time synchronization requirement for joint transmission and because of the fact that JT Trigger frames are used for time synchronization among the Slave APs, use of the wired backhaul for transmission of JT Trigger frames is possible only when it can be guaranteed that all the participating Slave APs receive the JT Trigger frame at the same time. In this case, the Payload Type field is set to "AP Coordination" and the Ethertype 89-0d frame payload carries JT Trigger frames. The "AP Coordination Packet Type" field in this case is set to JT Trigger frame (set to 4 as indicated in Table 620 in FIG. 6) and the Packet Content field carries the JT Trigger frame, while the other fields in the payload are omitted. This kind of deployment removes the constraint of requiring the Slave APs to be in wireless range of the Master AP and enables joint transmission on a much larger scale, where a Master AP in a centralized location can remotely manage joint transmission in multiple physical locations. However if it cannot be guaranteed that all the participating Slave APs receive the JT Trigger frame at the same time, the JT Trigger frame is transmitted over the wireless medium.

In such cases where a Target STA is not associated with the Master AP, the Master AP may not know the value to be used for the Sequence Control field, or the CCMP Packet Number (PN) which are locally generated by the Slave AP. For example if the Target STA is associated with Slave AP1, prior to the data distribution phase 1320, the Master AP initiates the Info query phase 1310 and queries the Slave AP1 for the next Sequence Control to be used, and optionally the CCMP Packet Number (PN) and encryption Key ID to be used for transmission to the Target STA. The Master AP uses the queried information to set the respective fields of the encapsulated JT Data if entire MPDUs are distributed to the Slave APs, or the information is distributed to the Slave APs if MPDUs for joint transmission are locally generated by the Slave APs.

At some point prior to the data distribution phase 1320, the Master AP also makes arrangements for the upper layer data to be routed through itself instead of through the Slave AP1. This may be done by temporarily updating the routing table of the network router device forwarding the data payload to the APs such that the Master AP is recorded as the serving AP for the Target STA.

During the data distribution phase 1320, the Master AP sets the MAC header fields of the encapsulated JT Data such that the data appears to be generated by the Slave AP1 with which the Target STA is associated, e.g. the Address 2 (TA) field of the jointly transmitted MPDUs is set to the MAC address of the Slave AP1. Also, the sequence number subfield in the sequence control field of the MPDUs (of the JT Data) are used as implicit JT Identifiers, so explicit JT Packet IDs are not assigned to the JT Data. During the Joint Transmission phase 1330, the Master AP still initiates a joint transmission by transmitting the JT Trigger frame, however only the Slave APs participate in the actual joint transmission. For the Target STA, the transmission appears to be initiated by the Slave AP1.

Figure 14:
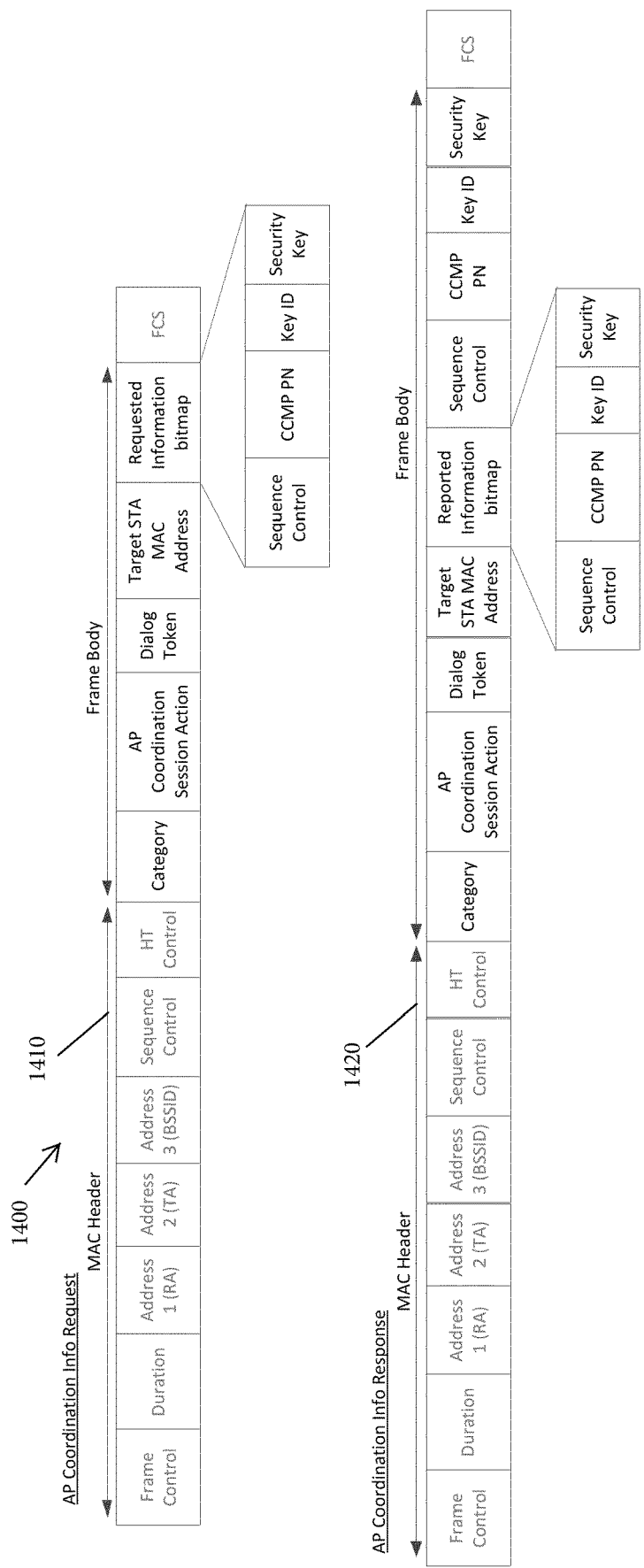
FIG. 14 shows Action Frames used by AP in the information query phase to gather information from another AP in accordance with an example embodiment.

FIG. 14 shows Action Frames 1400 used by AP in the information query phase to gather information from another AP in accordance with an example embodiment.

The AP Coordination Info Request frame includes the Requested Information bitmap that indicates the information about the Slave APs parameters for a Target STA that are solicited by the Master AP. The Slave AP uses the AP Coordination Info Response frame to report the solicited information to the Master AP, the included information being indicated by the Reported Information bitmap Although the Master AP can initiate the request, it is also possible for Slave APs to initiate the request. The AP Coordination Info Request frame 1410 includes the Requested Information bitmap that indicates the information about the receiving AP's parameters for a Target STA that are solicited by the transmitting AP. The recipient AP uses the AP Coordination Info Response frame 1420 to report the solicited information to the soliciting AP, the included information fields being indicated by the Reported Information bitmap. If a bit is set to 1 in the Reported Information bitmap, the corresponding field is included in the AP Coordination Info Response frame 1420, otherwise it is not present.

Figure 15:
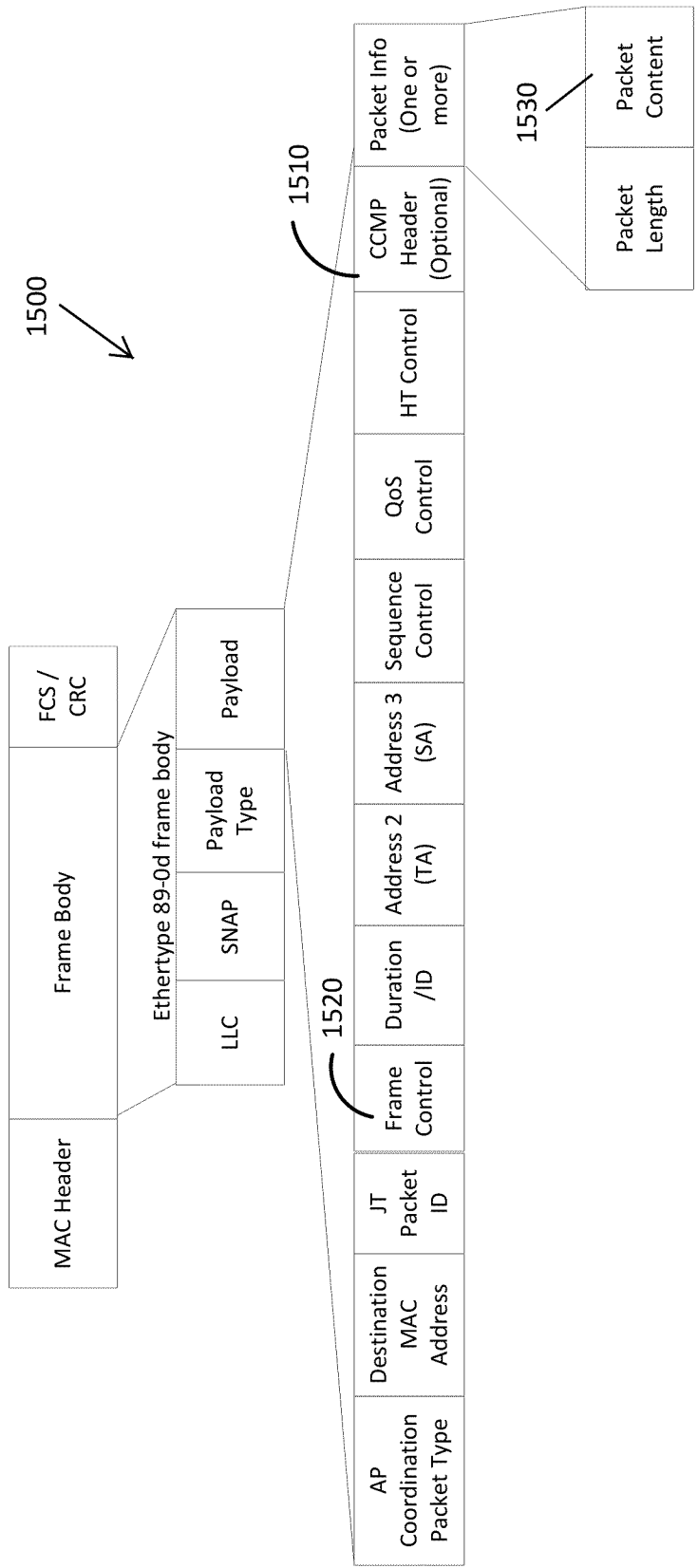
FIG. 15 shows a frame for data sharing from the Master AP to Slave APs in accordance with an example embodiment.

FIG. 15 shows a frame 1500 for data sharing from the Master AP to Slave APs in accordance with an example embodiment.

Instead of encapsulating the whole MAC layer frame (MPDU or A-MPDU), Master AP only encapsulates the upper layer data payload (also known as MSDU (MAC Service Data Unit)), and the other relevant fields of the MAC header within the Payload field of the Ethertype 89-0d frame body. If multiple data payloads are included, the sequence control field, and the CCMP header (if included) carry the starting Sequence Number (SN) and Packet Number (PN) respectively. Based on this, each Slave AP generates the MPDUs or A-MPDUs to be jointly transmitted. If required, encryption of data is performed by each Slave AP.

Copies of the Frame control, Duration/ID, QoS Control and HT Control fields are used by Slave APs to create MAC Headers for the locally generated MPDUs. Alternatively, some or all of these fields may also be distributed during JT Session setup if these fields remain the same throughout the JT session.

The CCMP Header field 1510 is present if the "Protected Frame" bit in the Frame Control field 1520 is set. The CCMP Header field 1510 carries the Packet Number (PN) to be used to encrypt the first MPDU with the subsequent MPDUs using sequentially increasing PN.

The Sequence Control field 1520 carries the Sequence Number (SN) to be used for locally created A-MPDUs. This is used as the starting SN for the first MPDU and increases sequentially for subsequent MPDUs in the A-MPDU.

The Packet Content field 1530 only carries higher layer payload (also known as MSDU). Each of the Slave APs append the locally generated MAC headers to the higher layer payload to generate the MPDUs for joint transmission.

Figure 16:
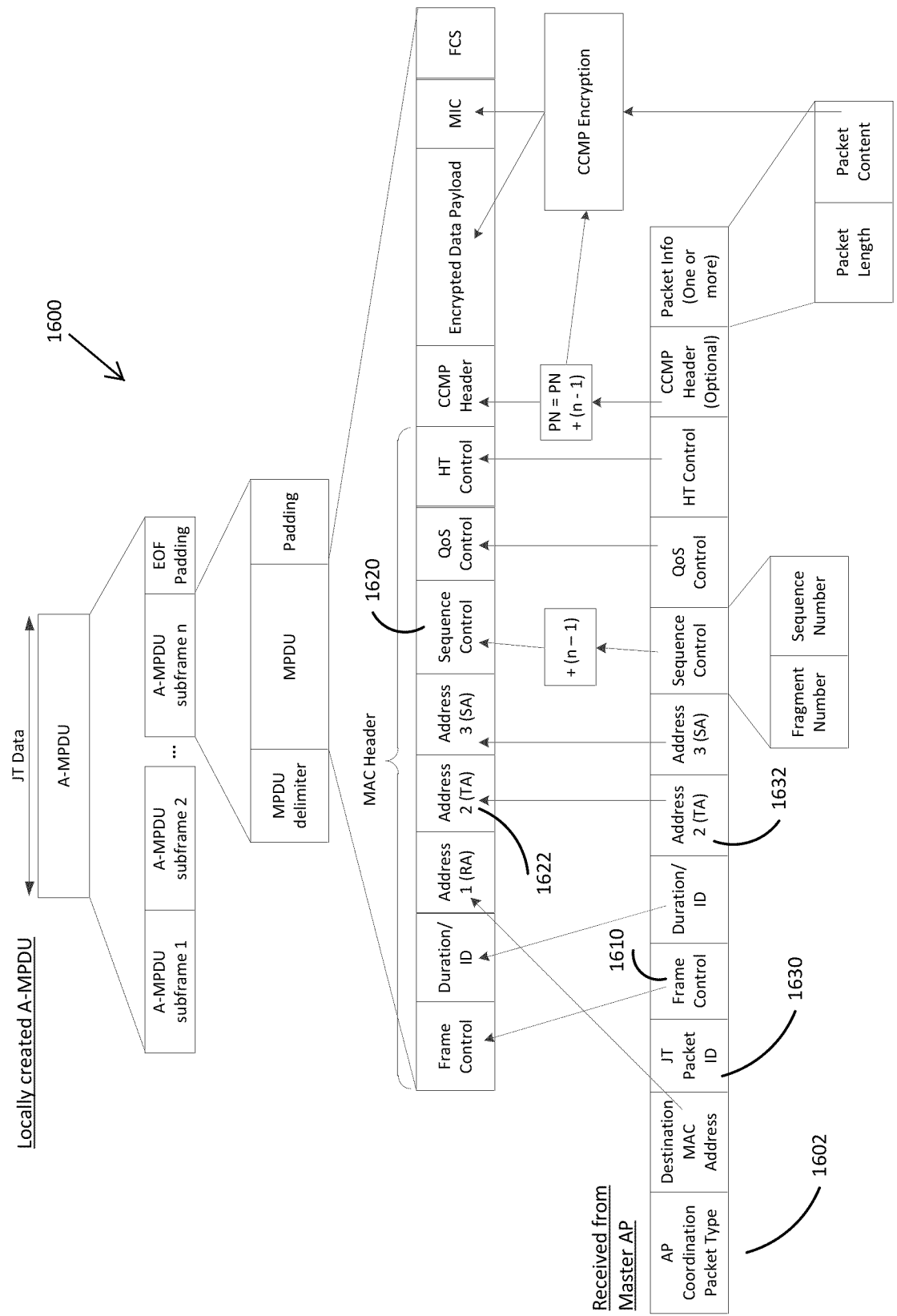
FIG. 16 shows a JT Data frame as an Aggregated MAC Protocol Data Unit (A-MPDU) in accordance with an example embodiment.

FIG. 16 shows a JT Data frame 1600 as an Aggregated MAC Protocol Data Unit (A-MPDU) in accordance with an example embodiment.

Each Slave AP generates the Joint Transmission Data frame 1600 locally and saves it in memory. For example, each Slave AP generates the MPDUs or A-MPDUs to be jointly transmitted based on the information 1602 received from the Master AP. Arrows in FIG. 16 means fields are simply copied over to the locally generated MPDUs, except some field that require additions. The first generated MPDU directly uses the Sequence Control field received from the Master AP, while each subsequent MPDU will increment the sequence number subfield within the Sequence control field 1620 by one. The MPDUs, or A-MPDUs may be generated right upon reception of the encapsulated data from the Master AP and saved in memory. If encryption is required (indicated by the "Protected Frame" bit in the Frame Control field 1610), each Slave AP also encrypts the data payload and generates and appends the MIC to the payload. The first encrypted MPDU directly uses the CCMP Header field received from the Master AP, while each subsequent MPDU will increment the PN subfield within the CCMP Header field by one. The encrypted MPDUs are saved in memory, indexed by the JT Packet ID 1630.

Alternatively, if the Slave APs have fast enough processors, during the data distribution phase, the received MAC parameters and payloads are saved in memory and the MPDU generation (and encryption if required) may be done only after JT Trigger frame is received.

In FIG. 16, the Address 2 (TA) field 1622 in the MPDUs of the locally created JT Data frame 1600 is also copied from the corresponding Address 2 (TA) field 1630 in the information 1602 received from the Master AP. The Address 2 (TA) field 1630 either set to the Master AP's MAC address or to one of the Slave APs MAC Address depending on the AP with which the Target STA is associated. The rest of the fields of each A-MPDU subframe (MPDU delimiter, Padding, FCS, etc.) as well as the EOF padding are locally generated. Further, in the CCMP Encryption frame, the CCMP encryption is performed by the Slave AP if the "Protected Frame" bit in the Frame Control field 1610 is set.

One benefit of the frame 1600 is that the overhead of data transfer over the backhaul is reduced.

Figure 17:
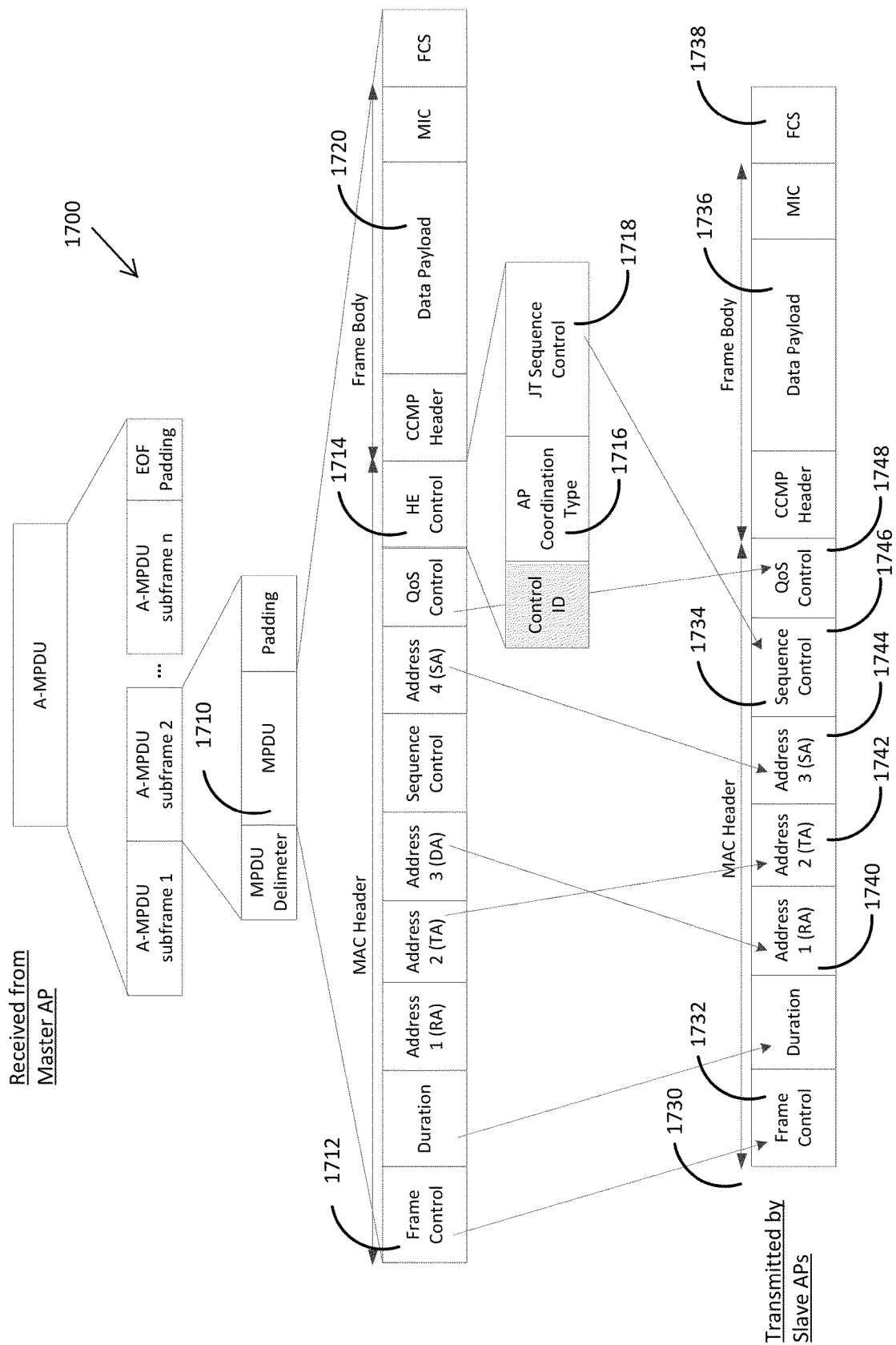
FIG. 17 shows a frame as an Aggregated MAC Protocol Data Unit (A-MPDU) used for data sharing to Slave APs in accordance with an example embodiment.

FIG. 17 shows a frame 1700 as an Aggregated MAC Protocol Data Unit (A-MPDU) used for data sharing to Slave APs in accordance with an example embodiment.

The Master AP uses the 802.11 Data frames 1700 with 4 Address MAC Header format to distribute JT Data to Slave APs (without using Ethertype 89-0d encapsulation). This distribution scheme may be used when the Slave APs are associated with the Master AP, for example in Wi-Fi EasyMesh deployments.

Upon receiving Joint Transmission Data from the Master AP, the Slave AP generates the MPDUs to be jointly transmitted. The Sequence Number within the Sequence Control fields 1734 in the MAC header of the generated MPDUs 1730 are used as implicit JT Identifiers.

Consider an example of deployments where the Target STA is associated with the Master AP and the Master AP also participates in the actual joint transmissions. The Master AP transmit the A-MDPU 1700 to the Slave AP to distribute the JT data. Each Data frame within the MPDUs of the A-MPDU uses the four address MAC Header format and the Frame Body of the MPDU 1710 carries the actual Data payload 1720 (encrypted if required and including the CCMP Header field and the MIC field) to be jointly transmitted. In this case the JT Data refers to the Data payload 1720 (encrypted if required and including the CCMP Header field and the MIC field). Since the final destination of the Data payload 1720 is not the Slave AP, the "To DS" and the "From DS" bits in the Frame Control field 1712 are both set to 1 to differentiate from AP to STA or STA to AP transmissions. The HE Control field 1714 is also enhanced for EHT usage and a new Control ID is defined for AP Coordination. The Control field may be used to carry control signals for various multi-AP Coordination schemes, the AP Coordination Type 1716 indicating the Coordination scheme and may be set to one of the values in Table 1020 in FIG. 10, for example to 2 for Joint Transmission in which case the subsequent field of the HE Control field is used to carry the JT Sequence Control 1718. The JT Sequence Control field 1718 carries the Sequence Control field 1734 of the actual MPDU to be jointly transmitted.

Upon receiving the A-MPDU 1710 from the Master AP that carries the HE Control field 1714 for AP Coordination, the addressed Slave AP (that is indicated by the Address 1 (RA)), instead of forwarding the A-MPDU to the Target STA (indicted by the Address 3 (DA)), generates the MPDUs or A-MPDUs to be jointly transmitted based on the information received from the Master AP. The generated MPDUs 1730 are 802.11 Data frames that use the three address MAC Header format.

In FIG. 17, the arrows signify fields are copied over from the received MPDUs to the generated MPDUs, except that in the generated MPDUs, the "To DS" bit in the Frame Control field 1732 is set to 0 while the "From DS" bit is set to 1. The Sequence Control field 1734 of the generated MPDU is copied over from the JT Sequence Control 1718 received from the Master AP. The Duration field, the Address 2 (TA) field and the QoS Control field are copied without any modification, while the Address 3 (DA) field is copied over to the Address 1 (RA) field and the Address 4 (SA) field is copied over to Address 3 (SA) field in the generated MPDUs. The HE Control field carrying the JT Sequence Control field is omitted in the generated MPDU. The frame body of the generated MPDU is directly copied over from the MPDU 1710 as received from the Master AP (i.e. without any further processing). The FCS field 1738 however is generated locally by the Slave APs. An important aspect to note here if the Data Payload 1720 is encrypted, is that the CCMP encryption is performed for the consumption of the Target STA and hence the MAC header parameters used for the encryption is based on the MAC header fields that are included in the actual MPDU 1730 that are jointly transmitted and not based on the MAC header fields of the MPDU 1710. Specifically, during the CCMP encapsulation procedure, the Master AP uses the Frame Control field 1732, Address 1 (RA) field 1740, Address 2 (TA) field 1742, Address 3 (SA) field 1744, the Sequence Control field 1746 and the QoS Control field 1748 as would be generated by the Slave APs to construct the additional authentication data (AAD) to be used for the CCMP encryption. The Address 4 field is not included in the AAD. The CCMP Header field, the encrypted data payload 1720 and the generated MIC are included in the frame body of MPDU 1710 and are directly copied over to the frame body of MPDU 1730 by the Slave APs without further processing. This significantly reduces the processing overhead related to encryption for Slave APs.

The MPDUs, or A-MPDUs may be generated by the Slave APs right upon reception of the data from the Master AP and saved in memory. The MPDUs are saved in memory indexed by the Sequence Number subfield of the Sequence Control field 1734. Alternatively, if the Slave APs have fast enough processors, during the data distribution phase, the received MPDUs/A-MPDUs are saved in memory without any modification and the MPDU generation (for joint transmission) may be done only after JT Trigger frame is received.

Figure 18:
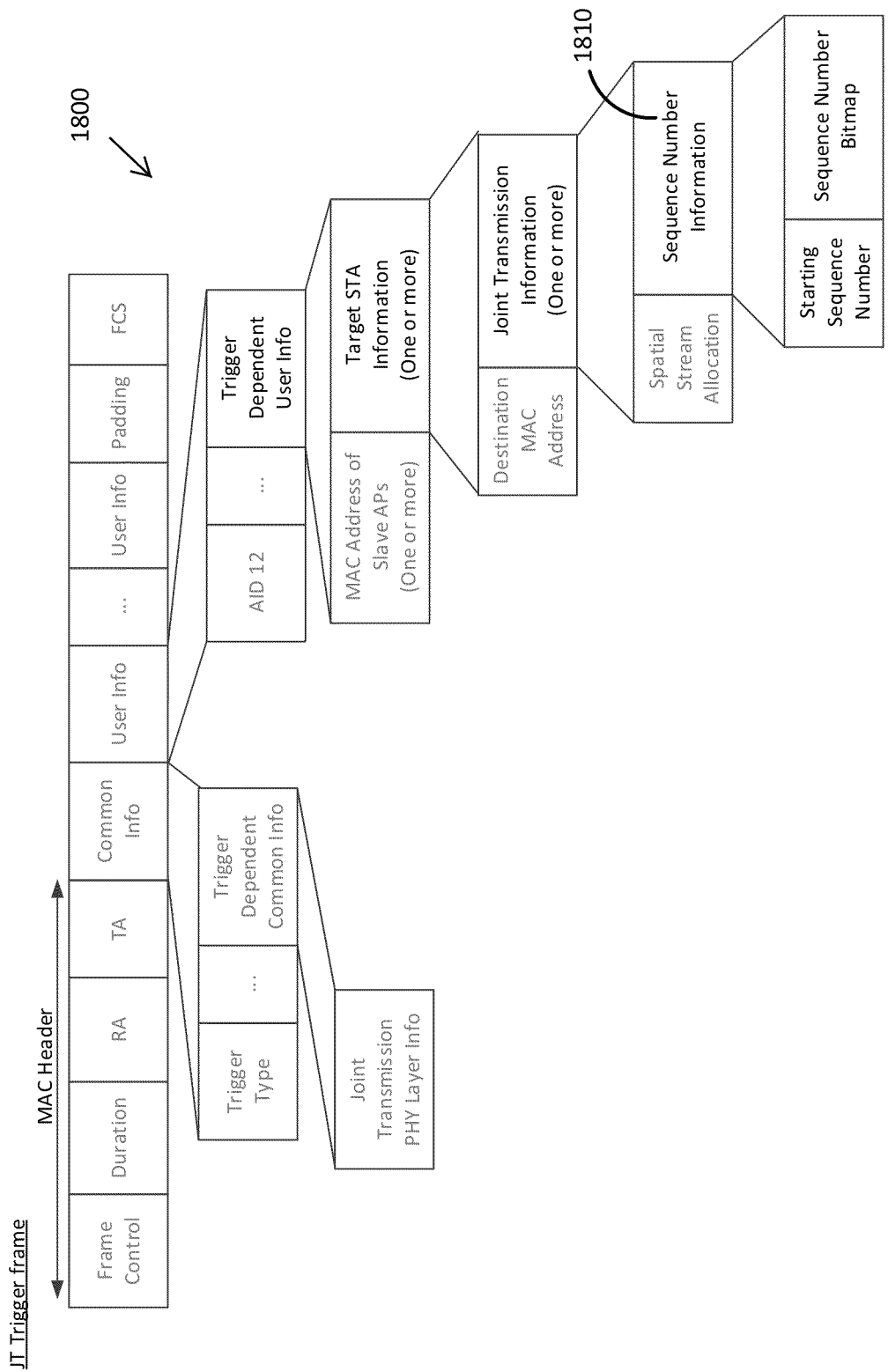
FIG. 18 shows a Joint Transmission Trigger frame in accordance with an example embodiment.

FIG. 18 shows a Joint Transmission Trigger frame 1800 in accordance with an example embodiment.

The JT Trigger frame includes a list of Sequence Number of MPDUs to be jointly transmitted. Slave APs construct the A-MPDU from the saved MPDUs if required.

The sequence number subfield in the sequence control field of the MPDUs (JT Data), for example 1620 in FIG. 16 or 1732 in FIG. 17, are used as implicit JT Identifier. This allows the Master AP more flexibility in choosing the content of the JT Data during the actual joint transmission (by indicating specific sequence numbers in the Sequence Number Information field 1810 in the JT Trigger frame 1800).

This flexibility can be executed, for example, during joint re-transmissions in which only the failed MPDUs are re-transmitted. The Sequence Number Information field 1810 identifies the MPDUs to be jointly transmitted. The bits set to 1 in the Sequence Number Bitmap subfield indicates the sequence number of the MPDUs to be included, with the first bit (n=1) in the bitmap corresponding to the Starting Sequence Number (SSN) subfield and the nth bit corresponding to (SSN+n−1).

Figure 19:
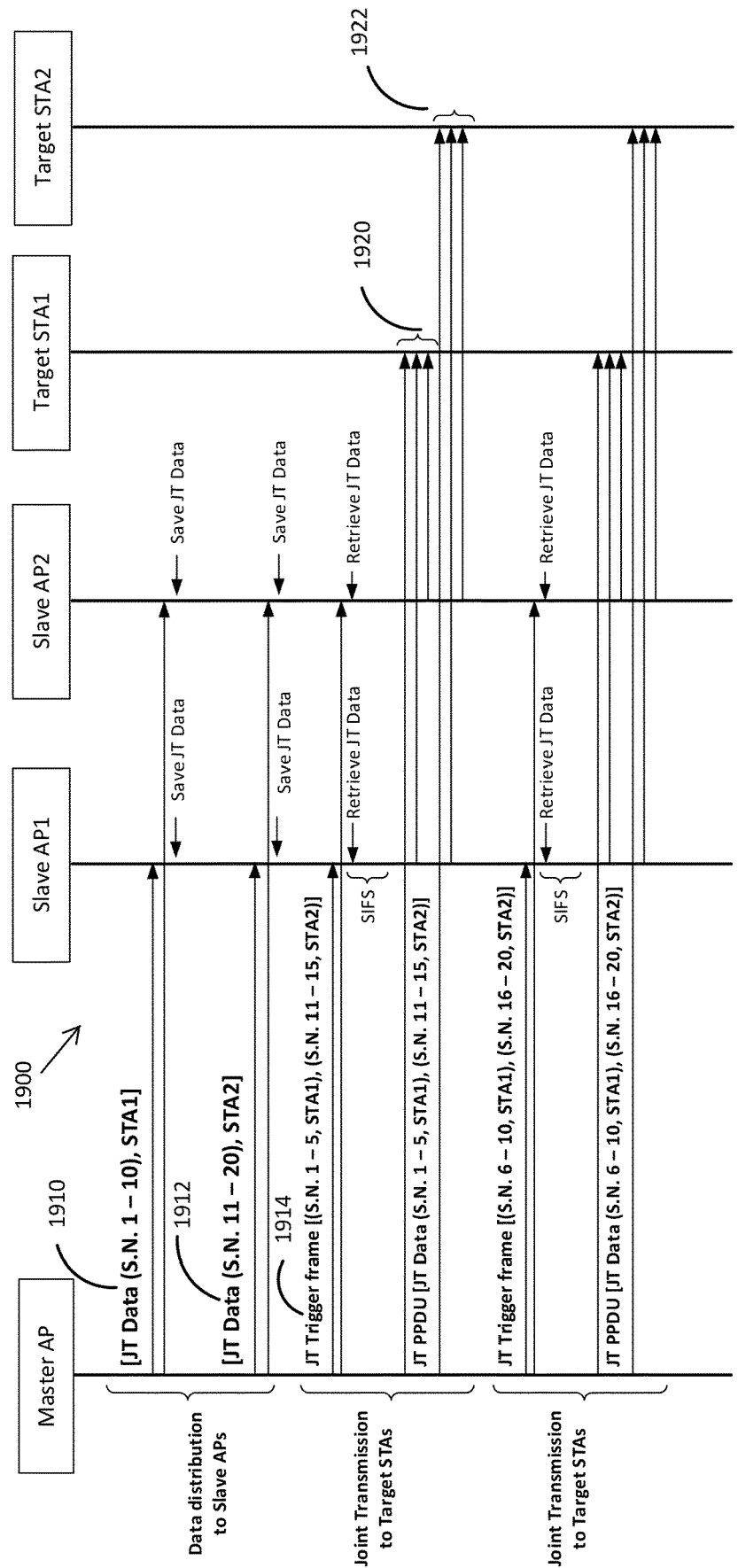
FIG. 19 is example of Distributed MU-MIMO Joint Transmission to two STAs that are both associated with the Master AP in accordance with an example embodiment.

FIG. 19 is example of Distributed MU-MIMO Joint Transmission 1900 to two STAs that are both associated with the Master AP in accordance with an example embodiment.

Numbers 1910 and 1912 show data distribution to the Slave APs. JT Data are distributed to Slave APs that are destined for STA1 and STA2 respectively. For example the JT Data 1910 and 1912 may be A-MPDU 1700 in FIG. 17. Upon receiving the JT Data 1910 and 1920, the Slave APs may generate the MPDUs 1730 for joint transmission by copying over the necessary fields from the received JT Data. The Slave APs may further aggregate the locally generated MPDUs into a single A-MPDU and save the A-MPDU in the designated local buffer. Number 1914 shows the Joint Transmission Trigger frame used to initiate the joint transmission to Target STAs. The JT Trigger frame 1914 initiates the MU joint transmission that uses two Spatial Streams. Number 1920 shows Joint transmission to STA1: S.N 1-5 to STA1 using Spatial Stream 1. Number 1922 shows Joint transmission to STA2: S.N 11-15 to STA2 using Spatial Stream 2. 1920 and 1922 take place at the same time but use different spatial streams.

Figure 20:
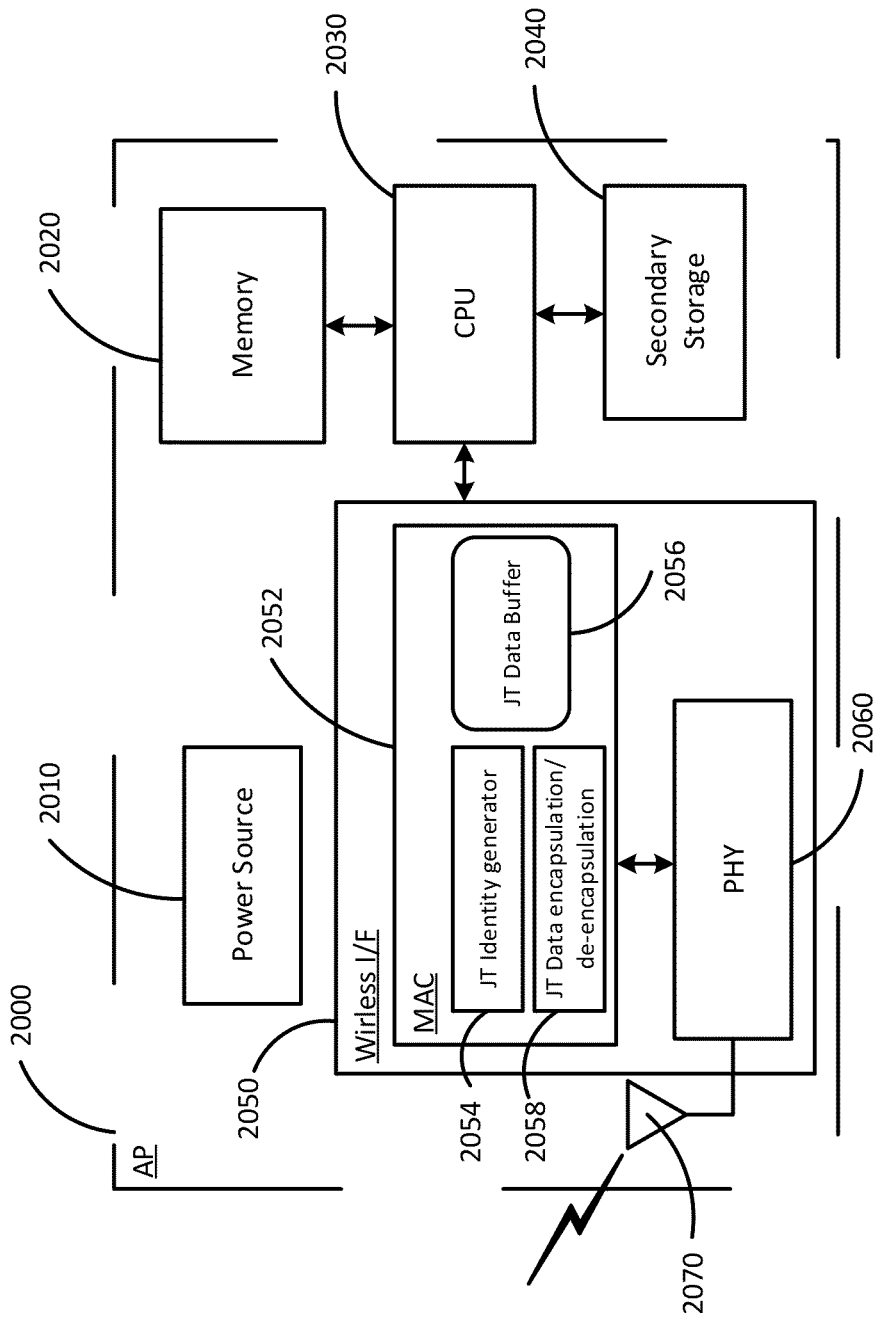
FIG. 20 is an example of an electronic device in accordance with an example embodiment.

FIG. 20 is an example of an electronic device 2000 in accordance with an example embodiment.

The electronic device 2000 includes a power source 2010, memory 2020, central processing unit (CPU) 2030, secondary storage 2040, and wireless OF 2050 (including a transmitter and/or receiver). The wireless OF 2050 includes a MAC 2052 and PHY 2060 in communication with an antenna 2070. The MAC 2052 further includes a JT Identity generator 2054, JT Data Buffer 2056, and a JT Data encapsulation/de-encapsulation 2058.

Consider an example embodiment in which the electronic device 2000 is an AP, such as a Master AP or Slave AP (noting that the JT Identity generator 2054 is only present in Master AP).

The electronic device 2000 includes circuitry that operates to generate a frame that includes the JT data and a JT identity that uniquely identifies the JT data. For example, the JT Identity generator block 2054 is responsible for generating the JT identity corresponding to the JT Data distributed to the Slave APs. The JT Data encapsulation/de-encapsulation block 2058 is used by the Master AP to encapsulation the JT Data within an 802.11 Data frame or an 802.3 Ethernet frame during data distribution phase. The block is used by the Slave AP to de-encapsulate the JT Data received from Master AP. The JT Data Buffer 2056 stores the JT Data used for joint transmission. In the Master AP, this may not be a separate buffer but may be a shared buffered that stores all outgoing data frames. In the Slave AP, this may be a separate buffer used exclusively to store data frames to be used for joint transmissions. The electronic device 2000 further includes circuitry, such as a wireless transmitter and/or antenna 2070, that enable the APs to transmit the data frames to one or more communication apparatus, such as to one or more STAs in a wireless network.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

Other example embodiments include but are not limited to the following examples.

One example embodiment is an access point (AP) comprising: circuitry, which, in operation, generates a frame, a frame body of the frame includes joint transmission (JT) data and a JT identity that uniquely identifies the JT data; and a transmitter, which, in operation, transmits the frame to one or more APs that jointly transmit the JT data to a communication apparatus.

With the access point, the circuitry, in operation, generates a JT trigger frame that includes the JT identity of the JT data, and the transmitter in operation, transmit the JT trigger frame to the one or more APs.

With the access point, the JT trigger frame includes a MAC address of the communication apparatus.

With the access point, the JT data is carried as a payload of an Ethertype 89-0d frame body.

With the access point, the frame is one of an IEEE 802.11 data frame and an Ethernet frame.

With the access point, the JT data is one or more MAC Protocol Data Units (MPDU) addressed to the communication apparatus.

With the access point, the JT identity is one of a uniquely assigned JT packet ID, a value of a Sequence Number subfield within a Sequence Control field of an encapsulating IEEE 802.11 data frame, and value of a Sequence Number subfield within a Sequence Control field of a MPDU within a JT Data.

With the access point, JT data has higher layer payload and common fields required by the receiving APs to locally construct one or more MAC Protocol Data Units (MPDU) jointly transmitted to the communication apparatus.

With the access point, the JT data is carried as a payload of an IEEE 802.11 Data frame using a four address MAC header format; a MAC header of the IEEE 802.11 Data frame includes a control field that indicates a Sequence Control field of the IEEE 802.11 Data frame to be jointly transmitted; and the JT identifier includes a value of a Sequence Number subfield within the Sequence Control field.

With the access point, the access point negotiates an AP Coordination session with the one or more APs, the AP Coordination session specifies an AP coordination scheme as Joint Transmission, and the AP Coordination session is identified by a session ID.

With the access point, the access point transmits a PHY Protocol Data Unit (PPDU) constructed from the JT data after a fixed duration from an end of a JT Trigger frame.

Another example embodiment is an access point (AP) that comprises a receiver, which, in operation, receives from an AP a frame that includes Joint Transmission (JT) data and a JT identity that uniquely identifies the JT data; and local memory that stores the JT data and the JT identity.

With the access point, the receiver further operates to receive from the AP a JT Trigger frame carrying the JT identity of the JT data; the access point retrieves the JT data with matching JT identity from the memory and transmits a physical layer protocol data unit (PPDU) constructed from the JT data after a fixed duration from an end of the JT Trigger frame.

Another example embodiment is a communication method in which one or more access points (APs) jointly transmit to a communication apparatus. The method comprises transmitting, from a first AP and to one or more second APs, a frame in which a frame body of the frame includes joint transmission (JT) data and a JT identity that uniquely identifies the JT data; and transmitting, from the one or more second APs, the JT data jointly to the communication apparatus.

The method further comprises synchronizing PHY and MAC parameters at two or more transmitting APs such that the transmission signals received by a communication apparatus from the two or more transmitting APs are exactly the same.

The invention claimed is:

1. An access point (AP) comprising:
   circuitry, which, in operation, generates a frame including multi-AP coordinated transmission data and a multi-AP coordinated transmission identity that uniquely identifies the multi-AP coordinated transmission data; and
   a transmitter, which, in operation, transmits the frame to one or more other APs that transmit the multi-AP coordinated transmission data to a communication apparatus,
   wherein the circuitry, in operation, generates a trigger frame that includes the multi-AP coordinated transmission identity of the multi-AP coordinated transmission data, and the transmitter, in operation, transmits the trigger frame to the one or more other APs.

2. The access point of claim 1, wherein the multi-AP coordinated transmission is Joint transmission (JT).

3. The access point of claim 1, wherein the trigger frame includes a MAC address of the communication apparatus.

4. The access point of claim 1, wherein the multi-AP coordinated transmission data is carried as a payload of an Ethertype 89-0d frame body.

5. The access point of claim 1, wherein the frame is one of an IEEE 802.11 data frame or an Ethernet frame.

6. The access point of claim 1, wherein the multi-AP coordinated transmission data is one or more MAC Protocol Data Units (MPDU) addressed to the communication apparatus.

7. The access point of claim 1, wherein the multi-AP coordinated transmission data has a higher layer payload and common fields required by the receiving APs to locally construct one or more MAC Protocol Data Units (MPDU) transmitted to the communication apparatus.

8. The access point of claim 1, wherein the circuitry encapsulates the multi-AP coordinated transmission data, and the frame includes the encapsulated multi-AP coordinated transmission data and the multi-AP coordinated transmission identity.

9. A communication method for an access point (AP), the communication method comprising:
   generating a frame including multi-AP coordinated transmission data and a multi-AP coordinated transmission identity that uniquely identifies the multi-AP coordinated transmission data;
   transmitting the frame to one or more other APs that transmit the multi-AP coordinated transmission data to a communication apparatus;
   generating a trigger frame that includes the multi-AP coordinated transmission identity of the multi-AP coordinated transmission data; and
   transmitting the trigger frame to the one or more other APs.

10. The communication method of claim 9, wherein the multi-AP coordinated transmission is Joint transmission (JT).

11. The communication method of claim 9, wherein the trigger frame includes a MAC address of the communication apparatus.

12. The communication method of claim 9, wherein the multi-AP coordinated transmission data is carried as a payload of an Ethertype 89-0d frame body.

13. The communication method of claim 9, wherein the frame is one of an IEEE 802.11 data frame or an Ethernet frame.

14. The communication method of claim 9, wherein the multi-AP coordinated transmission data is one or more MAC Protocol Data Units (MPDU) addressed to the communication apparatus.

15. The communication method of claim 9, wherein the multi-AP coordinated transmission data has a higher layer payload and common fields required by the receiving APs to locally construct one or more MAC Protocol Data Units (MPDU) transmitted to the communication apparatus.

16. The communication method of claim 9, wherein the multi-AP coordinated transmission data is encapsulated, and the frame includes the encapsulated multi-AP coordinated transmission data and the multi-AP coordinated transmission identity.

* * * * *